United States Patent Office 3,647,787
Patented Mar. 7, 1972

3,647,787
PROCESS IMPROVEMENT FOR CONVERTING PENICILLIN SULFOXIDE ESTERS TO CEPHEM COMPOUNDS
Robin D. G. Cooper, Indianapolis, Ind., assignor to Eli Lilly and Company, Indianapolis, Ind.
No Drawing. Continuation-in-part of applications Ser. No. 636,592, Ser. No. 636,593, and Ser. No. 636,629, all May 8, 1967. This application July 2, 1969, Ser. No. 838,697
Int. Cl. C07d 99/24
U.S. Cl. 260—243 C     25 Claims

ABSTRACT OF THE DISCLOSURE

Tertiary carboxamides, urea derivatives, and/or sulfonamides are used to direct the conversion of penicillin sulfoxide esters, via exposure to acid conditions at elevated temperature, more specifically toward production of desacetoxycephalosporin antibiotics.

CROSS REFERENCE

This application is a continuation-in-part application of my prior applications, Ser. Nos. 636,592, 636,593, and 636,629, all filed on May 8, 1967, now abandoned.

BACKGROUND OF THE INVENTION (1) Field of the invention

This invention relates to the field of penicillin and cephalosporin antibotic substances. More particularly, this invention provides a process for improving the yield and quality of cephalosporin antibiotics produced by heating analogous penicillin sulfoxide esters.

(2) Description of the prior art

United States Pat. No. 3,275,626, issued Sept. 27, 1966 to Robert B. Morin and Billy G. Jackson, entitled "Penicillin Conversion Via Sulfoxide" discloses and claims a method for preparing antibiotics by heating a penicillin sulfoxide ester under acid conditions to effect conversion thereof to a variety of products, including desacetoxycephlosporin-type antibotics. Those patentees discovered that the characteristic thiazolidine ring of penicillin could be converted to the characteristic thiazine ring of the cephalosporins by heating a penicillin sulfoxide ester at a temperature of from about 100° C. to about 175° C. in the presence of an acid. They thus provided a chemical route for obtaining a number of cephalosporin antibiotics that were otherwise unobtainable on a practical basis.

This Morin/Jackson discovery is very important but was found to present some practical difficulties. In their process, Morin and Jackson employed their penicillin sulfoxide starting material in the form of an ester, e.g., the methyl ester of the particular penicillanic acid derivative which it was desired to convert. The ester group which remained on the resulting desacetoxycephalosporin product could not be removed easily in any commercially significant yield. This was a significant detriment to the process, since the presence of the ester group caused a material reduction in antibiotic activity of the desacetoxycephalosporin.

On Aug. 23, 1966, Robert R. Chauvette and Edwin H. Flynn filed a patent application, Ser. No. 574,311, now abandoned, but replaced by application Ser. No. 708,518, filed Feb. 27, 1968, now U.S. Pat. No. 3,536,698, which described and claimed procedures for forming easily cleaved esters of penicillanic acids to protect the penicillanic acid carboxyl group during a process for preparing and converting penicillin sulfoxides to desacetoxycephalosporin esters.

However, in the penicillin sulfoxide rearrangement process conducted by Morin and Jackson, and as improved by the easily cleaved esters provided by Chauvette and Flynn, the product obtained upon heating the penicillin sulfoxide ester starting material has always been a mixture of products, only a small part of which has been the desired desacetoxycephalosporins. The yields of the desired product have thus been lower than desired and the process so conducted has required extensive isolation and purification procedure to obtain the desired desacetoxycephalosporin.

SUMMARY

Briefly, this invention provides a method or process for directing the penicillin sulfoxide ester conversion of Morin and Jackson more specifically toward production or formation of the desired desacetoxycephalosporin. This process improvement involves heating under acid conditions a solution of the penicillin sulfoxide ester in a tertiary carboxamide, urea derivative, and/or sulfonamide which is a liquid at the desired conversion temperature to an elevated temperature between about 80° C. and about 175° C. for a time sufficient to form the desired desacetoxycephalosporin.

The tertiary carboxamide, urea derivative, and/or sulfonamide is present in the reaction medium containing the penicillin sulfoxide ester in an amount sufficient to direct the penicillin sulfoxide ester conversion more specifically toward formation of the corresponding desacetoxycephalosporin than was possible before this invention in a given set of reaction conditions. Generally, the tertiary carboxamide, urea derivative, or sulfonamide constitutes at least about 25 percent by volume of the liquid medium in which the penicillin sulfoxide ester is heated. Preferably, the tertiary carboxamide, urea derivative, and/or sulfonamide liquid constitutes at least 50 percent by volume of the liquid medium. Better results may be obtained when the tertiary amide liquid (whether carboxamide, urea derivative, or sulfonamide) constitutes the only solvent used in addition to the acid substance and penicillin sulfoxide ester, but economics may dictate that the tertiary carboxamide, urea derivative, and/or sulfonamide be diluted somewhat with one or more inert organic liquids in commercial processes for most economically efficient and optimum yields and product quality. Obviously, mixtures containing one or more carboxamides, tertiary ureas, and/or sulfonamides can be used.

The process of the present invention, like the processes as to which it is an improvement, is broadly applicable to the conversion of the prior art penicillins, so long as they are not otherwise converted under the conditions of acidity and elevated temperature employed. In all cases, they must be esterified and must be converted into the corresponding sulfoxide prior to treatment. A wide range of penicillins can be effectively treated in accordance with the invention, including benzyl penicillin, n-heptyl penicillin, phenylmercaptomethyl penicillin, and the like. The preferred penicillin is phenoxymethyl penicillin ("penicillin V"). Penicillin nucleus (6-aminopenicillanic acid, "6–APA") can also be treated successfully, but the 6-amino group should first be protected with an easily removable group, such as carboallyloxy, tert-butoxycarbonyloxy, or the like. The product obtained by treatment of the N-protected or blocked 6–APA is the corresponding N-protected 7-amino-desacetoxycephalosporanic acid ("7–ADCA") ester, which, after cleavage of the N-protecting group, can be acylated in a known manner to produce the desired desacetoxycephalosporin in the form of the ester. The ester group can be cleaved before, during, or after acylation as desired. For example, the 2,2,2-trichloroethyl 7-amino-desacetoxycephalosporanate ester (7–ADCA ester) prepared by the heat conversion of 2,2,2-trichloroethyl 6- aminopenicillanate sulfoxide ester (6–APA sulfoxide ester) by the improved method of this invention, can be acylated with 2-(2-thiophene)acetyl chloride to form the 2,2,2-trichloroethyl 7-(2-thiophenacetamido)desacetoxycephalosporanate ester, which ester can be treated with acetic acid and zinc dust by known methods to remove the 2,2,2-trichloroethyl ester group and to form the 7-(2-thiopheneacetamide)desacetoxycephalosporanic acid antibiotic.

However, it is preferred to apply the process improvement of this invention to the direct conversion of a penicillin sulfoxide ester (a 6-acylated penam sulfoxide ester) to the desired corresponding desacetoxycephalosporin. That is, a penicillin which has an acylamido group in the 6 position of the penicillin nucleus, is treated with an oxidizing agent to convert the penicillin thiazolidine sulfur to the sulfoxide oxidation state, and with an esterifying agent to protect the penicillin carboxyl group with an ester group which can be cleaved readily in the manner described by Chauvette and Flynn, supra, either before or after forming the sulfoxide. Examples of easily cleaved ester groups which can be used in the penicillin sulfoxide ester starting materials include 2,2,2-trichloroethyl, 2,2-dichloroethyl, p-methoxybenzyl, p-methoxyphenyl, 3,5-dimethoxybenzhydryl, 4,4-dimethoxybenzhydryl, benzhydryl, p-nitrobenzyl, and the like. Then the resulting penicillin sulfoxide ester is dissolved in an organic, substantially anhydrous, liquid medium containing at least about 25 percent by volume of the selected tertiary carboxamide, urea derivative, and/or sulfonamide and heated to conversion temperature for a time sufficient to convert the penicillin sulfoxide ester to the corresponding desacetoxycephalosporin ester in improved yield.

There are many tertiary carboxamides, urea derivatives, and/or sulfonamides which can be used in the improved process of this invention. However, the effective tertiary carboxamides which are presently most economical or readily available can be categorized as having the following general formula:

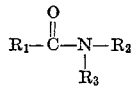

wherein (1) $R_1$ is hydrogen, and each of $R_2$ and $R_3$ is alkyl, phenyl, tolyl, or xylyl such that $R_2$ and $R_3$ together contain up to about 14 carbon atoms;

(2) At least one of $R_1$, $R_2$, and $R_3$ is alkyl, and not more than two of $R_1$, $R_2$, and $R_3$ are phenyl, tolyl, or xylyl, nad $R_1$, $R_2$, and $R_3$ together contain up to about 18 carbon atoms;

(3) $R_1$ is hydrogen or alkyl, $R_2$ and $R_3$ are taken together with the nitrogen to which they are bonded to form a saturated monocyclic ring which contains from 4 to 6 carbon atoms in the ring, which ring can also contain an oxygen ring member, gamma to the ring nitrogen, and $R_1$, $R_2$, and $R_3$ together contain not more than 12 carbon atoms; and/or (4) $R_1$ and $R_2$ are taken together with the amide grouping

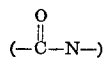

to which they are bonded to form a saturated carbonyl-containing monocyclic ring having from 4 to 6 ring carbon atoms, $R_3$ is alkyl, phenyl, tolyl, or xylyl, and $R_1$, $R_2$, and $R_3$ together contain not more than 14 carbon atoms.

Examples of tertiary carboxamides of the types described above, which may be used to effect the process improvement of this invention, include:

(1) N,N-dimethylformamide (DMF), N,N-diethylformamide, N,N - diisopropylformamide, N,N - dibutylformamide, N,N-dipentylformamide, N-methyl-N-ethylformamide, N-methyl - N - phenylformamide, N-ethyl-N-(m-tolyl)formamide, N-propyl-N-(3,5 - dimethylphenyl), N,N-diphenylformamide, N,N-bis(4-methylphenyl)formamide, N-(3,5-dimethyl) - N - methylformamide, N,N-bis(2,4-dimethylphenyl)formamide, and the like;

(2) N,N-dimethylacetamide (DMA), N,N-diethylacetamide, N,N-diisopropylacetamide, N,N-dibutylacetamide, N,N-di-tert-butylacetamide, N,N - dimethylpropionamide, N,N - diethylpropionamide, N,N - dipentylpropionamide, N,N-dimethylbutanoamide, N,N-diethylbutanoamide, N,N-dimethyldecanoamide, N,N-dimethylbenzamide, N,N-diethylbenzoamide, N,N-dipropyl-m-toluamide, N,N-dibutyl-p-toluamide, N-phenyl-N-methylacetamide, N-(p-tolyl)-N-ethylacetamide, N - (3,5 - dimethylphenyl)-N-methylpropionamide, N,N - dimethyl-3,5-dimethylbenzoamide, N,N - dibutyl-4-ethylbenzoamide, N,N - diphenylacetamide, N-(3 - methylphenyl)-N-ethylbenzoamide, N,N-bis(6 - methylphenyl)propionamide, N,N-bis(3,5 - dimethylphenyl)propionamide, and the like;

(3) N-formylpiperidine, N-acetylpyrrolidine, N-propionylmorpholine, N - acetyl-4,5-dimethylpyrrolidine, N-butanoylpiperidine, N-acetyl-6-methylpiperidine, and the like; and (4) 1-methyl-2-pyrrolidone, 1-phenyl-2-pyrrolidone, 1-butyl-2-piperidone, 1-pentyl-2-piperidone, 1-(m-tolyl)-2-piperidone, 1-ethyl-2-piperidone, 1-(3,5-dimethylphenyl)-2-piperidone, 1-methyl-2-piperidone, 1-phenyl-2-piperidone, 1-propyl-2-piperidone, 1-isopropyl-2-pyrrolidone, 1-(3-methylphenyl) - 2 - pyrrolidone, N-methyl-2-homopiperidone, N-ethyl-2-homopiperidone.

There are many tertiary urea derivatives which can be used in the improved process of this invention. However, the effective tertiary urea derivatives which are presently most economical or readily available, and thus those which have most practical usefulness in this process, can be categorized as having a general formula selected from the group consisting of

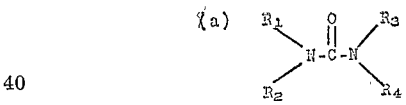

wherein $R_1$, $R_2$, $R_3$, and $R_4$ are alkyl, phenyl, tolyl, or xylyl such that $R_1$, $R_2$, $R_3$, and $R_4$ contain a combined total of up to about 18 carbon atoms,

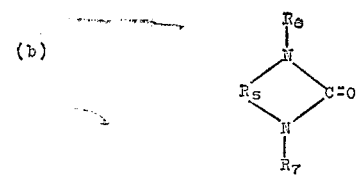

wherein $R_5$ is a bivalent alkylene radical having from 2 to 3 ring carbon atoms which alkylene radical is bonded to the nitrogens from different carbon atoms thereof, and each of $R_6$ and $R_7$ is an alkyl, phenyl, tolyl, or xylyl such that $R_5$, $R_6$, and $R_7$ have a combined total of up to about 12 carbon atoms, and

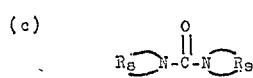

wherein each of $R_8$ and $R_9$ completes with the nitrogen to which it is bonded a monocyclic mononitrogen ring containing from 5 to 6 ring forming members, one of which ring members may be oxygen gamma to the ring nitrogen, the remaining ring members being saturated carbon atoms.

Examples of carbamide tertiary urea derivatives of the types described above, which may be used to effect the process improvement of this invention include:

(a) Tetramethylurea, tetraethylurea, N,N-dimethyl-N', N'-diethylurea, N,N'-dimethylcarbanilide, N-(p-tolyl)-N, N′,N′-trimethylurea, N,N′ - bis(3,5 - dimethylphenyl)-N, N′-diethylurea, and the like;

(b) 1,3-dimethyl - 2 - imidazolidone, 1,3-di-n-propyl-2-imidazolidone, 1,3-diisobutyl-2-imidazolidone, 1-methyl-3-phenyl-2-imidazolidone, 1,3,4,5-tetramethyl-2-imidazolidone, 1,3-dimethyl-4,5-diethyl-2-imidazolidone, 1-ethyl-3-(p-tolyl)-2-imidazolidone, 1,3 - dimethyl-2-hexahydropyrimidone, 1,3-bis(hydroxymethyl) - 2 - tetrahydropyrimidone, 1-isopropyl - 2 - tetrahydropyrimidone, 1,3-di-tert-butyl-2-tetrahydropyrimidone, 1,3 - diisopropyl-2-hexahydropyrimidone, and (c) 1,1′ - carbonyldipyrrolidine, 1,1′ - carbonyldipiperidine, 1,1-carbonyldimorpholine, and the like.

There are many tertiary sulfur amides which can be used in the improved process of this invention. However, the effective tertiary sulfur amides which are presently most economical or readily available can be categorized as having the following general formula:

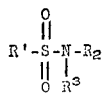

wherein (1) Each of $R_1$, $R_2$, and $R_3$ is $C_1$–$C_{10}$ alkyl, phenyl, tolyl, or xylyl, at least one of $R_1$, $R_2$, and $R_3$ is $C_1$–$C_{10}$ alkyl, and $R_1$, $R_2$, and $R_3$ together contain not more than 18 carbon atoms.

(2) $R_1$ is an alkyl radical of from 1 to 10 carbon atoms, phenyl, tolyl, or xylyl and $R_2$ and $R_3$ are taken together with the nitrogen atom to which they are bonded to complete a monocyclic ring radical bonded to the sulfur atom, which radical contains from 4 to 6 saturated carbon atoms, and which radical can contain a ring member oxygen atom gamma to the ring nitrogen, such that $R_1$, $R_2$, and $R_3$ together contain up to about 12 carbon atoms;

(3) $R_1$ and $R_2$ are taken together with the sulfonamide grouping

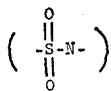

to which they are bonded to form a sulfur oxide and mononitrogen monocyclic ring having from 3 to 5 saturated ring carbon atoms therein, and $R_3$ is alkyl, phenyl, tolyl, or xylyl such that $R_1$, $R_2$, and $R_3$ together contain up to about 12 carbon atoms, and/or (4) $R_1$ is —$NR_4R_5$ and each $R_2$, $R_3$, $R_4$, and $R_5$ is alkyl such that the sulfondiamide formed thereby contains up to about 12 carbon atoms.

Examples of sulfonamides which may be used in the process of this invention include:

(1) N,N - dimethylmethanesulfonamide, N,N - diethyl-methanesulfonamide, N,N - di - tert-butylmethanesulfonamide, N,N-dioctylmethanesulfonamide, N,N-dimethylethanesulfonamide, N - phenyl - N - ethylmethanesulfonamide, N,N-bis(4-methylphenyl)butanesulfonamide, N-(p-tolyl)-N-propylmethanesulfonamide, N-methyl-N-(3,5-dimethylphenyl)ethanesulfonamide, N-ethyl - N - methyl-benzenesulfonamide, N,N - dimethyloctane sulfonamide, N,N-diethyloctanesulfonamide, N,N-dimethyl - 4 - ethyl-benzenesulfonamide;

(2) N-(methylsulfonyl)pyrrolidine, N-(ethylsulfonyl)-pyrrolidine, N-(phenylsulfonyl)pyrrolidine, N-(propylsulfonyl)pyrrolidine, N - (hexylsulfonyl)pyrrolidine, N-(propylsulfonyl)piperidine, N - (methylsulfonyl)morpholine, N-(phenylsulfonyl)morpholine, N-(heptylsulfonyl)piperidine;

(3) 2-phenylisothiazolidine-1,1-dioxide, 2-methylisothiazolidine - 1,1 - dioxide, 2-hexylisothiazolidine-1,1-dioxide, 2-phenyltetrahydro-2H-1,2-thiazine - 1,1 - dioxide, 2-ethyltetrahydro-2H-1,2-thiazine-1,1-dioxide; and (4) Tetramethylsulfondiamide, N,N′ - tetrapropylsulfondiamide, and the like.

In conducting the process of this invention, the penicillin sulfoxide ester is dissolved in the tertiary carboxamide, urea derivative, or sulfonamide solvent, either as the only solvent, or mixed with an optimum proportion of another tertiary carboxamide, urea derivative, or sulfonamide, or an inert organic liquid diluent or both with the aid of heat, if necessary, as defined above, and with the acid substance used to promote the rearrangement which follows. Use of the tertiary carboxamide, urea derivatives, or sulfonamide, as the only solvent except for the acid substance is preferred for highest yields of desacetoxycephalosporin products. For best results, the penicillin sulfoxide ester concentration in the selected tertiary carboxamide, urea derivative, or sulfonamide medium, that is, the total solvent, is maintained below about 15 percent by weight, preferably below 10 percent by weight.

The acid substance can be commingled or mixed with the tertiary carboxamide, urea derivative, or sulfonamide medium before, simultaneously with, or after the penicillin sulfoxide ester starting material is dissolved in the medium. The acid substance should be a non-oxidizing protic acid or Lewis acid capable of accepting electrons from the oxygen of the thiazolidine sulfoxide bond in the tertiary carboxamide/penicillin sulfoxide ester/acid mixture. Preferred acid substances for use in the improved process of this invention include the alkanoic acid anhydrides having from 2 to 6 carbon atoms in each acid moiety, such as acetic anhydride, propionic anhydride, n-butanoic anhydride, pentanoic anhydride, hexanoic anhydrides, and mixed anhydrides of $C_2$–$C_6$ alkanoic acids, cyclic saturated dibasic acid anhydrides such as succinic anhydride, glutaric anhydride, strong Lewis acids such as aluminum chloride, boron trifluoride, hydrogen fluoride, ferric chloride, and strong non-oxidizing mineral acids such as p-toluenesulfonic, benzenesulfonic, methanesulfonic, naphthalenesulfonic, and other sulfonic acids, or various phosphorus acids such as ortho phosphoric acid, methylphosphonic, and the like, hydrochloric acid, as well as other acidic substances such as thionyl chloride, cyanogen bromide, and the like. For reasons of availability, cost and generally better results, acetic anhydride and aluminum chloride are especially preferred acid substances.

The concentration of acid substance used will vary depending upon the nature of the substance, the concentration of the penicillin sulfoxide ester, the tertiary carboxamide, urea derivative, or sulfonamide used, the desired time of reaction, etc. In general, amounts of acid substance ranging from about 1 percent to about 20 percent by volume of total solvent medium can be used. With lower amounts of acid, the time of reactions is undesirably slow for practical use. Larger amounts of acid may be used but are not necessary. For best practice it is preferred that the acid substance be present in amounts at least equimolar to the molar concentration of the penicillin sulfoxide esters, and in most cases the higher yields are obtained in the shortest times when from about 2 to about 5 molar equivalents of the acid substance per molar equivalent of the penicillin sulfoxide ester are used at the optimum temperature.

The penicillin sulfoxide ester in the acidified tertiary carboxamide, urea derivative, or sulfonamide solvent is heated to from about 80° C. to about 175° C. to direct the rearrangement of the penicillin sulfoxide ester to the desacetoxycephalosporin. In the preferred tertiary carboxamide, urea derivatives, or sulfonamide solvents, the preferred heating temperature is from about 90° C. to about 150° C. for from about 1 to about 15 hours. Lower temperatures require more time, while at higher temperatures the reaction mixture tends to discolor and produce a more complex rearrangement product.

In preparing the penicillin sulfoxide esters for use as starting materials in the process of this invention, the penicillin sulfoxide may be prepared prior to esterifying the penicillanic acid carboxyl group, or alternatively the selected penicillin ester may be esterifid first and then the resulting penicillin ester may be sulfoxylated according to conventional methods. Reference is made to the Morin and Jackson patent, U.S. 3,275,626, and the Chauvette and Flynn application, Ser. No. 574,311, filed Aug. 23, 1966, both cited above, for the details thereof.

By way of example and for completeness, the following summarizes the steps that can be taken to prepare a desired desacetoxycephalosporin from a given penicillin sulfoxide ester. A typical example involves the preparation of a 7 - (D - α - phenylglycylamido)desacetoxycephalosporanic acid, an orally active cephalosporin-type antibiotic, from the corresponding 6-(D-α-phenylglycylamido)-penicillanic acid sulfoxide ester.

(a) Prepare a haloformate of a desired amino-protecting group, e.g., by reacting phosgene with 2,2,2-trichloroethanol to obtain the 2,2,2-trichloroethyl chloroformate.

(b) Protect the amino group on D-α-phenylglycine, e.g., by reacting D-α-phenylglycine with 2,2,2-trichloroethyl chloroformate to obtain the N-(2,2,2-trichloroethoxycarbonyl)-D-α-phenylglycine.

(c) Activate the carboxyl group of the N-(2,2,2-trichloroethoxycarbonyl)-D-α-phenylglycine by reacting it with methyl chloroformate to obtain the N-(2,2,2-trichloroethoxycarbonyl)-D-α-phenylglycine methyl carbonate.

(d) Form the desired penicillin, e.g., by reacting 6-aminopenicillanic acid (6–APA) or a salt thereof with the N - (2,2,2 - trichloroethoxycarbonyl)-D-α-phenylglycine methyl carbonate to obtain the 6-[N-(2,2,2-trichloroethoxycarbonyl) - D - α - phenylglycylamido]penicillanic acid thereof.

(3) Prepare the sulfoxide of the protected phenylglycylpenicillanic acid, e.g., by reacting the penicillin with sodium metaperiodate or other equivalent oxidizing agent to form the 6-[N-(2,2,2-trichloroethoxycarbonyl)-D-α-phenylglycylamido]penicillanic acid sulfoxide thereof.

(f) Form the ester of the penicillin sulfoxide of step (e), e.g., by reacting the 6-[N-(2,2,2-trichloroethoxycarbonyl) - D - α - phenylglycylamido]penicillanic acid sulfoxide with 2,2,2-trichloroethanol in the presence of a carbodiimide to obtain the 2,2,2-trichloroethyl 6-[N-(2,2,2 - trichloroethoxycarbonyl) - D - α - phenylglycylamido]penicillanate sulfoxide ester.

(g) Dissolve the penicillin sulfoxide ester from step (f) in tertiary carboxamide, urea derivative, or sulfonamide solvent medium together with acetic anhydride or other equivalent acid substance to obtain an acidified tertiary carboxamide liquid solution of the penicillin sulfoxide ester.

(h) Heat the penicillin sulfoxide ester solution in the acidified tertiary carboxamide, urea derivative, or sulfonamide liquid medium to from about 80° C. to about 175° C. to form the desacetoxycephalosporin ester.

(i) Recover the desacetoxycephalosporanic acid from the reaction product obtained in step (h), e.g., by treating the product with 90 percent acetic acid and zinc dust for 1–3 hours at −5° to 20° C. to obtain the 7-(D-α-phenylglycylamido) - 3 - methyl - 3 - cephem - 4 - carboxylic acid [7-(D-α-phenylglycylamido)desacetoxycephalosporanic acid] which is useful as an antibiotic in combatting diseases caused by penicillin-resistant strains of *Staphylococcus aureus*.

The penicillin sulfoxide ester starting material and desacetoxycephalosporanic acid products of the process of this invention have sometimes been named using the penam nomenclature for the penicillins as described by Sheehan, Henery-Logan, and Johnson in the J. Am. Chem. Soc., 75, p. 3293, footnote 2 (1953), and which nomenclature has been adapted to the cephalosporins by Morin, Jackson, Flynn, and Roeske in the J. Am. Chem. Soc., 84, p. 3400 (1962). In accordance with these systems of nomenclature, "penam" and "cepham" refer respectively to the following saturated ring structures:

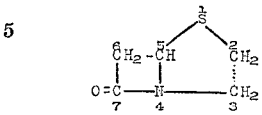
Penam

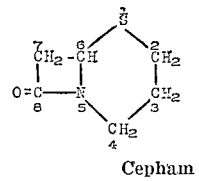
Cepham

"Cephem" refers to the cepham ring structure with a double bond, the position of which is indicated by a prefix number denoting the carbon atom of the lowest number to which the double bond is connected. By this system of nomenclature, 6-aminopenicillanic acid (6–APA) is named 6 - amino - 2,2 - dimethylpenam-3-carboxylic acid. 7-aminocephalosporanic acid (7–ACA) is named 7-amino-3-acetoxy-methyl-3-cephem-4-carboxylic acid.

The prior art describes literally thousands of penicillin compounds which can be converted to desacetoxycephalosporin compounds by the improved process of this invention. A few typical examples will illustrate, to those familiar with the art, penicillins which may be used as starting materials, and the desacetoxycephalosporins obtained therefrom. The desacetoxycephalosporin compounds produced by the process of this invention from the corresponding penicillin sulfoxide esters, are useful especially after ester group removal as antibiotics in therapy treatment of diseases caused by various gram-positive and gram-negative microorganisms. 7-amino-desacetoxycephalospornic acid (7–ADCA), produced from a corresponding 6-amino penicillanate sulfoxide ester by this invention, is useful as an intermediate to prepare desacetoxycephalosporin antibiotic substances. For example, 7-ADCA can be acylated with 2-thiopheneacetyl chloride to obtain 7-(7-thiopheneacetamido)-3-methyl-3-cephem-4-carboxylic acid, a known antibiotic.

The esterified penicillin sulfoxides listed below yield the indicated corresponding desacetoxycephalosporins after heat rearrangement of the penicillin sulfoxide esters according to the method of this invention and removal of the ester group by conventional methods.

6-[2′-methoxy-2′-(2″-thienyl)acetamido]-2,2-dimethyl-penam-3-carboxylic acid to obtain 7-[2′-methoxy-2′-(2″-thienyl)-acetamido]-3-methyl-3-cephem-4-carboxylic acid 6-(phenylacetamido)-2,2-dimethylpenam-3-carboxylic acid to obtain 7-(phenylacetamido)-3-methyl-3-cephem-4-carboxylic acid 6-(thiophene-2-acetamido)-2,2-dimethylpenam-3-carboxylic acid to obtain 7-(thiophene-2-acetamido)-3-methyl-3-cephem-4-carboxylic acid 6-(phenylmercaptoacetamido)-2,2-dimethylpenam-3-carboxylic acid to obtain 7-(phenylmercaptoacetamido)-3-methyl-3-cephem-4-carboxylic acid 6-(2′-furylacetamido)-2,2-dimethylpenam-3-carboxylic acid to obtain 7-(2′-furylacetamido)-3-methyl-3-cephem-4-carboxylic acid 6-(2′-protected amino-2′-phenylacetamido)-2,2-dimethyl-penam-3-carboxylic acid to obtain 7-(2′-protected amino-2′-phenylacetamido)-3-methyl-3-cephem-4-carboxylic acid 6-(butylmercaptoacetamido)-2,2-dimethylpenam-3-carboxylic acid to obtain 7-(butylmercaptoacetamido)-3-methyl-3-cephem-4-carboxylic acid 6-(heptylamido)-2,2-dimethylpenam-3-carboxylic acid to obtain 7-(heptylamido)-3-methyl-3-cephem-4-carboxylic acid 6-benzoyl-2,2-dimethylpenam-3-carboxylic acid to obtain 7-benzoyl-3-methyl-3-cephem-4-carboxylic acid.

The invention is further illustrated by the following detailed examples.

EXAMPLE 1

This example illustrates and compares the effect of various solvents on the rearrangement of penicillin sulfoxide esters to desacetoxycephalosporin products.

In this controlled study, the rearrangement reaction involved in the process of this invention was run using various liquids as solvents or diluents, by keeping constant the starting penicillin material, the amount thereof, the acid catalyst, the amount of acid catalyst, the time of the reaction, and the temperature of the reactant. The only variation was that after the reaction was completed, some of the test solvents or diluents were removed by distillation (procedure A) and some were removed from the reaction product by washing with water (procedure B). The washing procedure was followed when the test solvent was a high-boiling (over 180° C.) water-soluble solvent. Runs made using dimethylformamide as solvent for the reaction mixture and then removing the solvent by both distillation and by washing have confirmed equivalent results for a given set of reaction conditions.

The test procedures used were as follows:

(A) A suitable vessel containing a solution of 1 g. of penicillin V sulfoxide trichloroethyl ester and 1 g. of acetic anhydride (in some runs p-toluenesulfonic acid was used) in 50 ml. of the selected test solvent was placed in a stirred 130° C. bath for a period of either 1 hour or 19 hours. At the end of the selected time, the test solvent was removed from the reaction vessel by distillation at reduced pressure using a rotary evaporator. The reaction product residue was examined by thin layer chromatography (on silica gel using ethyl acetate or a benzene-ethyl acetate mixture as the developing solvent), establishing that the expected product was the main product as seen in a dominant single spot. The residue was then taken up in 25 ml. of 90 percent acetic acid solution, stirred in an ice bath at 5 to 10° C., while 1 gram of zinc dust was added to the solution. After three hours of stirring at 5 to 10° C., the reaction solution was filtered to remove zinc, and evaporated to dryness. The residue which resulted was taken up in a mixture of 100 ml. of water and 100 ml. of ethyl acetate. The pH of the resulting mixture was adjusted to pH 2 with 1 N hydrochloric acid. The acidified ethyl acetate and water layers were separated. The ethyl acetate solution was washed with water, and then stirred with 25 ml. of water, after which 1 N sodium hydroxide solution was added to adjust the pH to 6.5. The water layer was separated from the ethyl acetate and diluted to 50 ml. Two microliters of this aqueous solution were then used to run a bioautograph. Two microliters of an aqueous solution of the 7-(phenoxymethyl)-3-methyl-3-cephem-4-carboxylic acid product obtained using xylene as a penicillin sulfoxide ester rearrangement reaction solvent as described in the Morin-Jackson process was used as a standard. Against this standard, two microliters of an aqueous solution of the same product obtained using one of the other listed test reaction solvents were also spotted to run a bioautograph and to compare the effectiveness of the test solvent in relation to the standard prior art xylene reaction solvent. As the standard, the spot obtained from the aqueous product produced by using xylene alone as the reaction solvent was considered for this test as representing 100 percent of biological activity (the xylene reaction spot). The area of the spot obtained from the aqueous extracts of the reaction products obtained using the respective test solvents was compared to the area of the xylene reaction spot and the result was expressed as a relative percentage of the xylene reaction spot standard. These bioautograph spot tests give good correlation to yield or concentration of the product obtained in the given test solvent. The accuracy of these comparisons of test solvents was ±5 percent. The results are tabulated below.

(B) The same test procedure as is described in A above was used with the exception that the rearrangement reaction test solvent was not removed by distillation but was washed away from the reaction product with water. This wash procedure was used only with high boiling (B.P. over 180° C.) test solvents. The results of the test are tabulated below.

TABLE 1

| Test solvent | Reaction time | Recovery procedure | Biological activity,[1] percent of std. |
|---|---|---|---|
| Xylene[2] (standard) | 1 | A | 100 |
| Do | 19 | A | 37.5 |
| MIBK[3] | 1 | A | 0 |
| Anisole | 1 | A | 0 |
| 1-nitropropane | 1 | A | 0 |
| Tetrachloroethane | 1 | A | 0 |
| Chlorobenzene | 1 | A | 0 |
| Dioxane | 1 | A | 0 |
| Formamide | 1 | A | 0 |
| DMF | 1 | A | 250 |
| DMF | 1 | B | 250 |
| N-acetylmorpholine | 1 | B | 125 |
| N-methylpyrrolidone | 1 | B | 188 |
| DMF[2] | 1 | A | 125 |
| N,N-dimethylmethanesulfonamide | 1 | B | 112 |
| Tetramethylurea | 1 | B | 237 |

[1] The biological activity (bioautograph) test is a paper chromatography test procedure, described in Antibiotics and Chemotherapy, vol. IV, No. 7, July 1954, pp. 750–752, using *Bacillus subtilis* as the test organism. The results in this test are expressed as the percentage of desacetoxycephalosporin V [7-phenoxyacetamido-3-methyl-3-cephem-4-carboxylic acid] formed, compared with the amount of desacetoxycephalosporin V formed under the same conditions, using xylene as the reaction medium (100%).
[2] p-Toluenesulfonic acid was used as the acid substance in a chemically equivalent amount.
[3] MIBK is methyl isobutyl ketone.

The comparative tests illustrated by this example show the substantial improvement in yield of the desired desacetoxycephalosporin product which is obtained when a tertiary carboxamide, urea derivative, or sulfonamide is used as a medium for the rearrangement reaction of the process.

EXAMPLE 2

For this example a number of tertiary carboxamides were used as solvents or diluents for the heat rearrangement reaction as described in Example 1. The only exception was that solvent was not removed by distillation (a) or washing (b), as set forth in Example 1, but was allowed to remain while the desacetoxycephalosporin ester product was treated with 2 g. of zinc dust and 50 ml. of acetic acid to cleave the ester group and to form the desacetoxycephalosporin acid.

In these tests 1 g. of 2,2,2-trichloroethyl penicillin V sulfoxide ester (2,2,2-trichloroethyl-6-phenoxyacetamido-2,2-dimethylpenam sulfoxide ester) was diluted or dissolved in 50 ml. of the selected solvent and 1 g. of acetic anhydride was added thereto. The resulting mixture was warmed to 130° C. with stirring, and maintained at that temperature for 1 hour. After this time, the mixture was cooled to room temperature and 2 g. of zinc dust and 50 ml. of acetic acid were added to effect cleavage of the ester group and to form the desacetoxycephalosporanic acid product (7-phenoxyacetamido-3-methyl-3-cephem-4-carboxylic acid). The yields of the respective products were determined by the method described in Example 1, with the yield of product using xylene as the solvent in this run being used as the standard with a rating of 100. The yields of product obtained by the other listed solvents or diluents are indicated as a percentage of the xylene yield.

TABLE 2

| Test solvent: | Yield, percent of xylene standard |
|---|---|
| DMF | 250 |
| N,N-diethyl-m-toluamide | 112 |
| N,N-dimethyldodecanoamide | 112 |

EXAMPLE 3

Benzyl penicillin trichloroethyl ester

Penicillin G potassium salt (benzylpenicillin, potassium salt) (37.1 g., 0.1 mole) was stirred in one liter of methylene chloride while a slurry of pyridine hydrochloride (12 g., 0.1 mole in 50 ml. of methylene chloride was added After a few minutes a solution of 15 g. (0.1 mole) of 2,2,2-trichloroethanol in 50 ml .of methylene chloride was added followed by a solution of 20.6 g. (0.1 mole) of dicyclohexyl carbodiimide in 100 ml. of methylene chloride. The various additions were made at a temperature below 20° C. The reaction mixture was then stirred at room temperature overnight.

The reaction mixture was filtered and the solvent was removed at reduced pressure on the rotary evaporator. The crude trichloroethyl 6-(phenylacetamido)penicillanic acid ester residue was dissolved in ethyl acetate, cooled, and washed with dilute HCl and 5 percent NaHCO$_3$ solution, dried and concentrated. The crystalline residue was dissolved in 300 ml. of ethyl acetate and refrigerated over the weekend. The small amount of solid precipitate was removed by filtration, the filtrate then being concentrated. The evaporation residue was slurried with 200 ml. of ether, cooled, then filtered. The purified ester solid was washed with ether, then vacuum dried. Yield 30.3 g., M.P. 157–159° C. The nuclear magnetic resonance (NMR) spectrum was consistent with the expected structure for 2,2,2 - trichloroethyl 6-(phenylacetamido)penicillanate. The ester was used for sulfoxide preparation without further purification.

Trichloroethyl 6-phenylacetamidopenicillanate sulfoxide

To a solution of 4.7 g. (0.01 mole) of trichloroethyl 6-(phenylacetamido)penicillanate in 50 ml. of chloroform was added a solution of 2.2 g. (0.011 mole) of 85 percent m-chloroperbenzoic acid in 25 ml. of chloroform. An ice bath was used to hold the temperature below 25° C. during the addition. After 2 hours of stirring, the chloroform solution was washed with 5 percent sodium bicarbonate solution, dried with magnesium sulfate, and concentrated. The residue was triturated with ethyl ether and filtered. The white solid, 2,2,2-trichloroethyl 6-(phenylacetamido)penicillanate sulfoxide ester was washed with ether and vacuum dried. A yield of 4.05 g. was obtained, M.P. 167–169° C. Recrystallized from an ether-tetrahydrofuran mixture, the product gave 2.47 g. of a more pure sample, M.P. 174–176° C.

*Analysis.*—Calcd. for C$_{18}$H$_{19}$Cl$_3$O$_5$S (percent): C, 44.88; H, 3.97; N, 5.81; Cl, 22.07. Found (percent) C, 45.04; H, 4.20; N, 5.73; Cl, 21.75. The NMR spectrum was consistent with the proposed structure.

7-Phenylacetamido-3-methyl-3-cephem-4-carboxylic acid

A solution of 1 g. (2.1 mmoles) of 2,2,2-trichloroethyl-6-(phenylacetamido)penicillanate sulfoxide and 1.2 g. of acetic anhydride in 50 ml. of dimethylformamide (DMF) was warmed in a 130° C. oil bath for one hour. The DMF was then removed on a rotary evaporator. The residue of crude rearrangement product was shown by thin layer chromatography (TLC) to have only one major component. Without further purification, the oil was dissolved in 25 ml. of 90 percent acetic acid and 5 g. of zinc dust were added. The reaction mixture was stirred and cooled in an ice bath for three hours to remove the trichloroethyl ester group and to form the corresponding desacetoxycephalosporanic acid. The zinc was then filtered off and washed with acetic acid. The acetic acid solution was concentrated. The 7-(phenylacetamido)desacetoxycephalosporanic acid residue was stirred with water and ethyl acetate while adding NaHCO$_3$ to pH 7.5. The NaHCO$_3$ solution was acidified to pH 2 with concentrated HCl while being overlayered with ethyl acetate. The ethyl acetate layer containing the 7-(phenylacetamido)desacetoxycephalosporanic acid was shaken severel times with water, dried with magnesium sulfate and concentrated. The residue was dissolved in 10 ml. of ethyl acetate to which were added 20 ml. of "Skelly B" petroleum ether (B.P. 60–64° C.). The precipitated acid solid was collected, washed with "Skelly B" and vacuum dried, yielding 196 mg. of a light yellow solid. The NMR spectrum, titration, and UV absorption of this material were consistent with the proposed structure for 7-(phenylacetamido)-3-methyl-3-cephem-4-carboxylic acid. Results of paper and thin layer chromatography of the product were identical to those with an authentic sample prepared by acylation of 7-amino-3-methyl-3-cephem-4-carboxylic acid with phenylacetic acid.

EXAMPLE 4

2,2,2-trichloroethyl 6-(thiophene-2-acetamido) penicillanate

This ester was prepared from 23 g. (0.061 mole) of potassium 6-(thiophene-2-acetamido)penicillanate by the same esterification procedure described in Example 2. A yield of 16.5 g. (57 percent) of 2,2,2-trichloroethyl 6-(thiophene-2-acetamido)penicillanate ester was obtained, M.P. 126–129° C. The crude ester product had a good NMR spectrum and was used without further purification.

2,2,2-trichloroethyl 6-(thiophene-2-acetamido)penicillanate sulfoxide

This sufoxide compound was prepared as described in Example 2 using m-chloroperbenzoic acid in chloroform to oxidize the thiazolidine sulfur to the sulfoxide. A yield of 12.0 g. (67 percent) of trichloroethyl 6-(thiophene-2-actamido)penicillanate sulfoxide ester was obtained having a M.P. of 143–145° C. A sample of the sulfoxide ester recrystallized from ether-tetrahydrofuran, for analysis had a M.P. of 153–154° C.

*Analysis.*—Calcd. for C$_{16}$H$_{17}$Cl$_3$N$_2$O$_5$S$_2$ (percent): C, 39.39; H, 3.51; N, 5.74. Found (percent): C, 39.85; H, 3.82; N, 5.38. The NMR spectrum was consistent with the named structure.

7-(thiophene-2-acetamido)-3-methyl-3-cephem-4-carboxylic acid

A solution of 1 g. of 2,2,2-trichloroethyl 6-(thiophene-2-acetamido)penicillanate sulfoxide ester, 1.2 g. of acetic anhydride and 50 ml. of dimethylformamide (DMF) was heated at 130° C. for one hour. After removal of the DMF solvent, thin layer chromatography of the crude rearrangement product showed that the expected product was present. The trichloroethyl ester protecting group was cleaved as previously described to form the acid. Thin layer chromotography of the acid obtained showed a spot which had an R$_f$ value identical to 7-(thiophene-2-acetamido)-3-methyl-3-cephem-4-carboxylic acid prepared by other methods. Bioautographs in several solvent systems showed the the crude 7-(thiophene-2-acetamido)-3-methyl-3-cephem-4-carboxylic acid product contained a biologically active component which in paper chromatography ran the same as the named acid material, prepared by other methods.

EXAMPLE 5

7-phenylacetamido-3-methyl-3-cephem-4-carboxylic acid

Trichloroethyl 6-(2'-chloro-2'-phenylacetamido)penicillanate sulfoxide was prepared by esterifying 6-(2'-chloro-2'-phenylacetamido)penicillanic acid potassium salt, and forming the sulfoxide of the ester as described in Example 2. A portion of the trichloroethyl 6-(2'-chloro-2'-phenylacetamido)penicillanate sulfoxide ester thus prepared was dissolved in DMF and mixed with a slight molar excess of acetic anhydride. The acidified solution thus obtained was heated at 130° C. for about 1 hour to form the crude trichloroethyl 7-(2'-chloro-2'-phenylacetamido)-3-methyl-3-cephem-4-carboxylate ester. The crude ester was treated with zinc and acetic acid to cleave the ester group and form the acid. The crude acid isolated from the cleavage

13 was shown by NMR spectrum to be identical with 7-(2'-chloro - 2' - phenylacetamido)-3-methyl-3-cephem-4-carboxylic acid previously prepared. Analysis of the physical tests used to determine the presence and quality of the product confirmed that the 2,2,2-trichloroethyl group had been removed by the zinc-acetic acid treatment.

EXAMPLE 6

7-phenylmercaptoacetamido-3-methyl-3-cephem-4-carboxylic acid

A 0.55 g. portion of the 2,2,2-trichloroethyl phenylmercaptomethyl penicillin sulfoxide ester obtained from phenylmercaptomethyl penicillin by the method described in Example 2 was rearranged using acetic anhydride in DMF. After cleavage of the trichloroethyl protecting group, 163 mg. of amorphous solid were isolated. The NMR spectrum of the solid was consistent with the expected structure for 7-phenylmercaptoacetamido-3-methyl-3-cephem-4-carboxylic acid. Paper chromatography indicated it contained a biologically active component that moved the same as a sample of 7-phenylmercapto-3-methyl-3-cephem-4-carboxylic acid prepared by acylation of 7-aminodesacetoxycephalosporanic acid.

EXAMPLE 7

Penicillin V sulfoxide with hydrogen peroxide

Penicillin V [6-(phenoxyacetamido)penicillanic acid] (35 g., 0.1 mole) was dissolved in 90 percent acetic acid (250 ml.) at 10° C. and hydrogen peroxide (30 percent, 11., 0.11 mole) was added. The solution was stirred at room temperature for 2 hours, poured into water (600 ml.) cooled to 0° C., and filtered. The precipitate was dried in a vacuum at room temperature and recrystallized from acetone/hexane to give 30 g. (83 percent yield) of colorless crystals of 6-(phenoxyacetamido)penicillanic acid sulfoxide.

Penicillin V sulfoxide trichloroethyl ester

Penicillin V sulfoxide [6-phenoxyacetamido)penicillanic acid sulfoxide] (3.66 g., 0.01 mole) was dissolved in methylene chloride (200 ml.) containing some pyridine (1 ml.). 2,2,2-trichloroethanol (1.5 g., 0.01 mole) was added followed by N,N'-dicyclohexylcarbodiimide (2.03 g., 0.01 mole). The solution was stirred at 25° C. for 3 hours, filtered, and the filtrate evaporated in vacuo. The product was chromatographed on silica (Woelm), eluting with chloroform to give the 2,2,2-trichloroethyl (6-phenoxyacetamido)penicillanate sulfoxide as a white solid (3.4 g.), recrystallized from ether, M.P. 140° C.

Rearrangement of Penicillin V sulfoxide trichloroethyl ester

A solution of Pencillin V sulfoxide trichloroethyl ester (1,12 g., 2,25 mmole) in dimethylformamide (60 ml.) containing acetic anhydride (1.2 g., 5 moles excess) was heated at 134° C. (oil bath temperature) for 1 hour. The solvent was removed in vacuo at 60° C. and then ethyl ether (100 ml.) was added, followed by activated charcoal. The product absorbed onto the charcoal, which was removed by filtration. Elution of product from the charcoal with methylene chloride (500 ml.), washing of the product in methylene chloride solution with water, and removal of the methylene chloride solvent in vacuo gave the desacetoxycephalosporin V trichloroethyl ester [2,2,2-trichloroethyl 7-(phenoxyacetamido)-3-methyl-3-cephem-4-carboxylate] as a solid yellow foam (760 mg., yield 75 percent).

Removal of ester group

A solution of desacetoxychephalosporin V trichloroethyl ester [7-(phenoxyacetamido)-3-methyl-3-cephem-4-carboxylate trichloroethyl ester] (700 mg.) in 90 percent acetic acid (25 ml.) containing zinc dust (5 g.) was stirred at 10° C. for 3½ hours. The solution was filtered and the precipitate washed with acetic acid. The filtrate was evaporated in vacuo and the residue dissolved in a water-ethyl acetate mixture. The organic layer was separated, dried (MgSO$_4$), and the solvent removed in vacuo. The residue was dissolved in chloroform (20 ml.) and petroleum ether (B.P. 60–64° C.) added (200 ml.), causing white crystalline 7 - (phenoxyacetamido) - 3-methyl-3-cephem-4-carboxylic acid to appear. Filtration and drying in vacuo gave the acid (330 mg.).

EXAMPLE 8

$\alpha,\alpha$-Dimethyl-$\alpha$-phenoxymethylpenicillin sulfoxide (I)

Phenoxyisopropyl penicillin potassium salt [6-($\alpha,\alpha$-dimethyl - $\alpha$ - phenoxyacetamido) - 2,2-dimethylpenam-3-carboxylic acid, potassium salt] (50 g., 120 mmoles), was dissolved in 1 liter of water, and acidified to pH 5.4 with 1 N HCl. Sodium metaperiodate, 25.8 g. (120 mmoles), was finely pulverized and added portionwise to the stirred solution of the penicillin at room temperature. The mixture was filtered after two hours, cooled in an ice-water bath, and acidified to pH 2.5 with 6 N HCl in the presence of ethyl acetate. The ethyl acetate solution was separated and combined with a second extract of the aqueous layer, dried (MgSO$_4$), and concentrated to a small volume in vacuo. The 6-($\alpha,\alpha$-dimethyl-$\alpha$-phenoxyacetamido)-2,2-dimethyl-penam-3-carboxylic acid sulfoxide crystallized on cooling. The yield was 46 g. (97 percent), M.P. 140° C. Infrared (IR) and nuclear magnetic resonance (NMR) spectra were satisfactory; an electrometric titration of a sample of the penicillin sulfoxide in 66 percent aqueous dimethylformamide showed a pK'a of 4.7 and an apparent molecular weight of 394 (calcd. 394.5). A Karl-Fisher water determination showed 0.045 percent water by weight. A small sample of this penicillin sulfoxide was converted to its sodium salt [sodium 6-($\alpha,\alpha$-dimethyl-$\alpha$-phenoxyacetamido)-2,2-dimethylpenam-3-carboxylate sulfoxide] by back titration into water using 1 N NaOH. The water was evaporated to dryness and the residue was crystallized from water-acetone.

*Analysis.*—Calcd. for $C_{18}H_{21}N_2O_6SNa \cdot H_2O$ (percent): C, 49.75; H, 5.34; N, 6.45. Found (percent): C, 49.59; H, 5.49; N, 6.78.

Phenoxyisopropylpenicillin sulfoxide 2,2,2-trichloroethyl ester (II)

Method A

A 9 g. (22.8 mmoles) portion of 6-($\alpha,\alpha$-dimethyl-$\alpha$-phenoxyacetamido)-2,2-dimethylpenam-3-carboxylic acid sulfoxide, prepared as described above, was dissolved in 200 ml. of methylene chloride containing 2 ml. of dry pyridine. A solution of 2,2,2-trichloroethanol, 3.4 g. (22.8 mmoles), in 35 ml. of methylene chloride was added followed by N,N-dicyclohexylcarbodiimide, 4.9 g. (23.9 mmoles), in 35 ml. of methylene chloride. The reaction mixture was stirred overnight at room temperature. The precipitated N,N-dicyclohexylurea was filtered off and the solvent was removed by evaporation in vacuo. The phenoxyisopropyl penicillin sulfoxide ester residue was taken up in ethyl acetate, cooled, and washed successively with cold 5 percent HCl, 5 percent NaHCO$_3$ solution, and water. The ethyl acetate solution was concentrated to a smaller volume in vacuo and then diluted with petroleum ether for crystallization of the product. The yield of 2,2,2-trichloroethyl 6-($\alpha,\alpha$-dimethyl-$\alpha$-phenoxyacetamido)-2,2-dimethylpenam-3-carboxylate sulfoxide was 9.5 g. (79 percent); M.P. 139–141° C.; IR and NMR spectral analyses were satisfactory for a phenoxyisopropyl penicillin sulfoxide ester; thin layer chromatography, using silica-gel and an ethyl acetate-benzene (3:7) system for development and an iodine chamber to visualize the spots, showed a single component. A small sample was recrystallized for analysis; M.P. 141–143° C.

*Analysis.*—Calcd. for $C_{20}H_{23}Cl_3N_2O_6S$ (percent): C, 45.68; H, 4.41; N, 5.33. Found (percent): C, 46.23; H, 4.54; N, 5.30.

15
Method B

Phenoxyisopropylpenicillin sulfoxide (free acid form), 22.8 millimoles, was dissolved in 70 ml. of calcium hydride-dried tetrahydrofuran containing a molar equivalent of pyridine. The resulting mixture was stirred at ice-water temperature while a molar equivalent of 2,2,2-trichloroethyl chloroformate in 30 ml. of tetrahydrofuran was added dropwise. Pyridine hydrochloride precipitation was noted as soon as addition of the chloroformate began. The mixture was stirred in the cold for about 2 hours after the addition had been completed, and then stirred at room temperature for about 3 hours to insure complete reaction. The pyridine hydrochloride was filtered off, and the filtrate, containing the 2,2,2-trichloroethyl carbonic acid anhydride of phenoxyisopropyl penicillin sulfoxide, was heated briefly on the steam bath to effect decarboxylation to the 2,2,2-trichloroethyl ester. The tetrahydrofuran solvent was removed in vacuo. The crude product which remained as residue was taken up in cold ethyl acetate for successive washes thereof with cold 5 percent hydrochloric acid solution, aqueous 5 percent sodium bicarbonate solution, and water. The washed ethyl acetate solution was dried over magnesium sulfate, concentrated under vacuum to a smaller volume, and diluted with an equal volume of petroleum ether. The desired 2,2,2-trichloroethyl phenoxyisopropyl penicillin sulfoxide ester crystallized from the solution at room temperature in over 50 percent yield, M.P. 138–141° C. There was no depresssion of melting point of a mixture of this 2,2,2-trichloroethyl phenoxyisopropyl penicillin sulfoxide ester crystallized from the solution at room temperature in over 50 percent yield, M.P. 138–141° C. There was no depression of melting point of a mixture of this 2,2,2-trichloroethyl penicillin sulfoxide with another sample prepared from phenoxyisopropyl penicillin sulfoxide and 2,2,2-trichloroethanol in the presence of dicyclohexylcarbodiimide. Similarly, the nuclear magnetic resonance spectrum was satisfactory and identical with that for the same ester prepared by the carbodiimide method. The ester analysis was: Calcd. for $C_{20}H_{23}N_2O_6SCl_3$ (percent): C, 45.68; H, 4.41; N, 5.33. Found (percent): C, 46.23; H, 4.54; N, 5.30.

7 - ($\alpha,\alpha$, - dimethyl-$\alpha$-phenoxyacetamido) - 3 - desacetoxycephalosporanic acid 2,2,2, - trichloroethyl ester (III)

A 3.0 g. (5.7 mmoles) portion of the 6-(phenoxyisopropyl)penicillin sulfoxide ester, described above, was dissolved in 120 ml. of dimethylformamide (DMF) containing acetic anhydride, 2.9 g. (28.5 mmoles). The mixture was heated in an oil bath at 135° C. for one hour in a nitrogen atmosphere. The DMF was removed under high vacuum. The crude 2,2,2,-trichloroethyl 7-($\alpha,\alpha$-dimethyl-$\alpha$-phenoxyacetamido) - 3 - methyl - 3 - cepham-4-carboxylate residue was redissolved in 200 ml. of anhydrous ethyl ether and treated with 40 g. of decolorizing carbon, then filtered over a 100 g. carbon pad which was washed with 100 ml. of ether. The carbon was in turn extracted with 1 liter of methylene chloride. The methylene chloride solution was washed with water, dried (MgSO₄), and evaporated in vacuo, leaving 1.5 g. of a light yellow oil. Nuclear magnetic resonance analysis of this crude oil revealed the presence of 2,2,2-trichloroethyl 7-($\alpha,\alpha$-dimethyl - $\alpha$ - phenoxyacetamido)-3-methyl-3-cephem-4-carboxylate to the extent of at least 25 percent as evidenced by the presence of the C-3 methyl singlet at 7.91$\tau$ in the NMR spectrum.

7-($\alpha,\alpha$-dimethyl-$\alpha$-phenoxyacetamido)-3-desacetoxycephalosporanic acid (IV)

A 1.4 g. portion of the 2,2,2-trichloroethyl-7-($\alpha,\alpha$-dimethyl - $\alpha$ - phenoxyacetamido) - 3 - methyl-3-cephem-4-carboxylate ester was dissolved in 50 ml. of 90 percent acetic acid, cooled in ice, and treated with 10 g. of zinc dust. The mixture was stirred in the cold for three hours. The zinc was filtered off and washed with ethyl acetate.

16

The filtrate and wash containing the crude acid product were combined and evaporated to dryness. The residue was taken up in ethyl acetate, washed with water, over magnesium sulfate, and re-evaporated in vacuo. The 7-($\alpha,\alpha$ - dimethyl - $\alpha$ - phenoxyacetamido) - 3 - methyl-3-cephem-4-carboxylic acid was a yellow amorphous powder weighing 600 mg.

EXAMPLES 9, 10, and 11

7-($\alpha,\alpha$-dimethyl - $\alpha$ - phenoxyacetamido) - 3 - desacetoxycephalosporanic acid p - methoxyphenyl ester (VIII), p-methoxybenzyl ester (IX), 2,2-dichloromethyl ester (X)

The p-methoxyphenyl, p-methoxybenzyl, and 2,2,-dichloroethyl esters of 7-($\alpha,\alpha$ - dimethyl - $\alpha$ - phenoxyacetamido) - 3 - methyl - 3 - cephem-4-carboxylic acid, were prepared by dissolving the above respective 6-($\alpha,\alpha$-dimethyl-$\alpha$-phenoxyacetamido) - 2,2 - dimethylpenam-3-carboxylate sulfoxide esters in N,N-dimethylformamide, together with from 2 to 5 molar equivalents of acetic anhydride relative to the respective penam sulfoxide ester therein, and heating the resulting solutions to about 130–140° C. for about 1 hour. Nuclear magnetic resonance analysis of the crude solution reaction products showed that the crude products contained from about 25 percent to 40 percent yield on a molar basis of the respective cephem ester products.

EXAMPLE 12

Desacetoxycephaloglycin from corresponding penicillin sulfoxide ester 2,2,2-trichloroethyl chloroformate To a solution of phosgene, 40 g. (400 mmoles), in 200 ml. of dry benzene there were added dropwise 2,2,2-trichloroethanol, 15.8 g. (100 mmoles), and pyridine, 12 g. (152 mmoles) in a mixture of 200 ml. of dry benzene and 400 ml. of anhydrous ethyl ether with occasional cooling to keep the temperature slightly below 20° C. The addition required two hours. The precipitated pyridine hydrochloride was filtered off. The filtrate was cooled, poured into 1 liter of ice-water, and shaken in a separatory funnel. The organic layer was separated, dried over MgSO₄ and evaporated in vacuo. Distillation of the residue from over CaCO₃ gave a 15 g. (67 percent) yield of the 2,2,2-trichloroethyl chloroformate; B.P. 43° C./10.5 mm.; [n]=1.4698; $\lambda$max. 5.62$\mu$; the NMR analysis was satisfactory Analysis.—Calcd. for $C_3H_2Cl_4O_2$ (percent): Cl, 66.94. Found (percent): Cl, 66.74.

N-(2,2,2-trichloroethyloxycarbonyl)-D-phenylglycine (I)

A solution of D-phenylglycine, 22.7 g. (150 mmoles), in 300 ml. of water, 160 ml. of 1 N NaOH and 150 ml. of ether was cooled in an ice alcohol bath. While stirring, simultaneous dropwise additions of 2,2,2-trichloroethyl chloroformate, 42.5 g. (200 mmoles) in 200 ml. of dry dioxane and 200 ml. of 1 N NaOH were made. The additions required about one hour. The reaction mixture was maintained near 0° C. for another hour, washed with a large volume of cold ether, and then acidified to pH 2.5 in the presence of cold ethyl acetate. The organic layer was separated, washed with cold water, dried (MgSO₄), and evaporated in vacuo. The crystalline solid residue weighed 45 g. and was recrystallized by dissolving in 150 ml. of benzene, filtering, and diluting with 40 ml. of petroleum ether. The yield of pure N-(2,2,2-trichloroethoxycarbonyl)phenylglycine product was 30.2 g. (62 percent); M.P. 142–144° C.; electrometric titration in 66 percent aqueous dimethylformamide showed a pK'a=5.55 and an apparent molecular weight =332 (calcd. 327); the NMR analysis was satisfactory.

Analysis.—Calcd. for $C_{11}H_{10}Cl_3NO_4$ (percent): C, 40.45; H, 3.09; N, 4.29. Found (percent): C, 40.60; H, 3.24; N, 4.55.

6-[N-(2,2,2-trichloroethylcarbonyl)-D-phenylglycyl]aminopenicillanic acid (II)

2,2,2 - trichloroethyl chloroformate, 11.6 g. (85.0 mmoles), was dissolved in 420 ml. of analytical grade acetone containing a few drops of dimethylbenzylamine and cooled in an ice-alcohol bath. While stirring, N-(2,2,2 - trichloroethoxycarbonyl) - D - phenylglycine, 28.0 g. (85.0 mmoles), and triethylamine, 8.7 g. (86.0 mmoles) in 420 ml. of acetone were added dropwise over a period of thirty minutes to form the N - (2,2,2 - trichloroethoxycarbonyl) - D - phenylglycyl 2,2,2 - trichloroethyl carbonate. The mixture was stirred in the cold an additional fifteen minutes. 6 - aminopenicillanic acid (6-APA), 18.6 g. (85.0 mmoles), in 70 ml. of cold water containing triethylamine, 8.7 g. (86.0 mmoles), was added in one portion to the reaction. The mixture was stirred in the cold for two hours, concentrated in vacuo to remove the acetone and diluted with a volume of water. The aqueous solution was layered with ethyl acetate, cooled, and acidified to pH 2.5 with 1 N HCl. The ethyl acetate was separated, washed with cold water, and back-titrated into water to pH 6.7 with 1 N NaOH to form the sodium salt. The aqueous salt-containing layer was separated, filtered and evaporated to dryness in vacuo. The residue, after trituration with dry acetone, was a white amorphous powder, weighing 24.6 g. (53 percent yield); electrometric titration in 66 percent aqueous dimethylformamide showed a pK'a=5.25 and an apparent molecular weight=539 (calcd. 547); IR and NMR were as expected for the desired product.

6-[N-(2,2,2-trichloroethoxycarbonyl)-D-phenylglycyl]-aminopenicillanic acid sulfoxide (III)

An 18 g. portion of 6 - {α - [N - (2,2,2 - trichloroethoxycarbonyl) amino] - α - phenylacetamido} - 2,2-dimethylpenam - 3 - carboxylic acid sodium salt was dissolved in 300 ml. of water. The pH of the solution was adjusted to 5.4 with 1 N HCl. Sodium metaperiodate, 7.1 g. (33 mmoles), was added portionwise and the mixture was stirred at room temperature for two hours, acidified to pH 2.5 in the cold and in the presence of ethyl acetate. The organic layer containing the penicillin sulfoxide was separated, washed with cold water, dried over $MgSO_4$, and evaporated in vacuo. The crude penicillin sulfoxide residue weighed 16 g. Crystallization was effected by dissolving the product in 64 ml. of N,N-dimethylacetamide and diluting with 640 ml. of anhydrous ether, filtering, and diluting slowly with 40 ml. of petroleum ether. The yield of pure 6 - {α - [N - (2,2,2 - trichloroethoxycarbonyl) amino] - α - phenylacetamido}-2,2 - dimethylpenam - 3 - carboxylic acid sulfoxide product was 11.6 g. (56 percent); M.P. 153–155° C. As evidenced by NMR and IR analysis, this product was solvated with one mole of dimethylacetamide.

*Analysis.*—Calcd. for $C_{19}H_{20}Cl_3N_3O_7SC_4H_9NO$ (percent): C, 43.99; H, 4.65; N, 8.92. Found (percent): C. 44.26; H, 5.02; N, 8.65.

6 - [N - (2,2,2 - trichloroethoxycarbonyl) - D - phenylglycyl]aminopenicillanic acid sulfoxide, 2,2,2-trichloroethyl ester (IV)

A 7 g. (11.2 mmoles) portion of 6-[N-(2,2,2 - trichloroethoxycarbonyl) - D - phenylglycylamido] - 2,2-dimethylpenam - 3 - carboxylic acid sulfoxide was dissolved in 85 ml. of dry tetrahydrofuran (THF) containing pyridine, 1.77 g. (22.3 mmoles). The solution was cooled in an ice-alcohol bath and stirred while 2,2,2-trichloroethyl chloroformate, 3.6 g. (16.7 mmoles), in 20 ml. of THF. The mixture was stirred in the cold for two hours, at room temperature for three hours, and heated to gentle reflux for fifteen minutes. The solvent was removed in vacuo. The amine protected D-phenylglycylpenicillin sulfoxide ester residue was taken up in cold ethyl acetate for successive washes with water, 5 percent $NaHCO_3$ solution, and water. The ethyl acetate solution was dried ($MgSO_4$) and evaporated in vacuo, giving 5.2 g. of an amorphous solid. Crystallization from 7 ml. of ethanol gave a 4.5 g. (59 percent) yield of 2,2,2-trichloroethyl 6 - [N - (2,2,2 - trichloroethoxycarbonyl)-D - phenylglycylamido) - 2,2 - dimethylpenam - 3 - carboxylate sulfoxide ester product; M.P. 180–182° C. A 1 gram sample of this product was recrystallized from ethanol-water for analysis; M.P. 185–186° C.

*Analysis.*—Calcd. for $C_{21}H_2LCl_6N_3O_7S$ (percent): C, 37.51; H, 3.14; N, 6.25. Found (percent): C, 37.96; H, 3.39; N, 6.02.

7-(α-aminophenylacetamido)-3-desacetoxycephalosporanic acid (V)

A 3.2 g. (4.5 mmoles) portion of the 2,2,2 - trichloroethyl 6 - [N - (2,2,2 - trichloroethoxycarbonyl)-D-phenylglycylamido] - 2,2 - dimethylpenam - 3 - carboxylate sulfoxide ester was dissolved in 120 ml. of dimethylformamide solvent containing acetic anhydride, 2.3 g. (22.5 mmoles), and heated in an oil bath at 135° C. for one hour to effect rearrangement. The solvent and excess acid reagent were removed under high vacuum. The residual oil was taken up in 50 ml. of 95 percent acetic acid and cooled in ice. Zinc dust, 10 g. (153 mmoles), was added and the mixture was stirred in the cold for three hours to remove the blocking group from the glycyl amino nitrogen. The reaction mixture was filtered. The zinc was washed with two volumes of acetic acid. The wash and filtrate were combined and concentrated to dryness in vacuo. The crude desacetoxycephalosporin residue was taken up in 100 ml. water, cooled, and acidified to pH 1 with trifluoroacetic acid, and the desacetoxycephaloglycin trifluoroacetic acid salt was extracted with methylisobutylketone. The organic solvent was dried ($MgSO_4$) and evaporated in vacuo, and the residue was triturated with anhydrous ethyl ether, giving the trifluoroacetic acid salt of desacetoxycephaloglycin as a pink, amorphous powder. A bioautograph of this product (against a *Bacillus subtilis* seeded agar plate) of a paper chromatogram developed with butanol, acetic acid, water (3:1:1) showed a single biologically active spot corresponding exactly in $R_f$ value with that of desacetoxycephaloglycin [7 - (D - phenylglycylamido) - 3 - methyl-3 - cephem - 4 - carboxylic acid] prepared by an alternate synthesis. The NMR analysis showed the C-3-methyl absorption bond characteristic of desacetoxycephalosporins as a singlet at τ 7.90.

EXAMPLE 13

In separate runs, made under substantially identical conditions, 1 gram portions of 2,2,2-trichloroethyl phenoxymethyl penicillin sulfoxide [6-(phenoxyacetamido)-2,2-dimethylpenam-3-carboxylate sulfoxide] were dissolved in 10 ml. of (a) N,N-diphenylformamide, or (b) xylene, each solvent (a) and (b) containing 1 ml. of acetic anhydride as the acid substance. The respective mixtures were heated at 135° C. for about 1 hour to effect rearrangement of the penicillin sulfoxide ester to the corresponding 2,2,2-trichloroethyl 7-(phenoxyacetamido)-3-methyl-3-cephem-4-carboxylate.

The resulting reaction mixtures were cooled to room temperature, diluted with 75 ml. of tetrahydrofuran, and then 4 g. of zinc dust and 5 ml. of 90 percent acetic acid were added. The resulting mixtures were stirred at room temperature for about 2 hours.

The respective solutions were then filtered to remove zinc, the precipitate was washed with 100 ml. ethyl acetate. Then 200 ml. of water was added to the filtrate and the pH was adjusted to 7.5 with sodium bicarbonate. The aqueous phase was extracted with two 100 ml. portions of ethyl acetate, acidified to pH 2.5 and the re-extracted two 100 ml. portions of ethyl acetate. The ethyl acetate extracts containing the acid product were combined and washed with three 100 ml. portions of water. The ethyl acetate solution of the product was then dried over magnesium sulfate, and then the solvent was removed in vacuo to leave the product as a solid residue. The respective weights of acid product obtained were Solvent run: Wt. of acid product, mg.
  (a) N,N-diphenylformamide _____ 320
  (b) Xylene _____ 210

Samples of the above acid products were tested by bioautograph procedures, referred to in Example 1, to determine the identity and amount of the desacetoxycephalosporin in the acid product. The amounts of 7-(phenoxyacetamido)-3-methyl-3-cephem-4-carboxylic acid present in each acid product (a) and (b) above were compared by the size of the bioautograph spot given by the respective acid products (a) and (b), compared to the bioautograph spot given by pure 7-(phenoxyacetamido)-3-methyl-3-cephem-4-carboxylic acid (standard) in the same test run at the same time. The ratio of the size of the test acid product spots to the size of the spot of the standard permits the calculation of the amount of desired 7-(phenoxyacetamido)-3-methyl-3-cephem-4-carboxylic acid in the respective acid products. The amounts so calculated were (a) N,N-diphenylformamide, 146 mg., (b) xylene, tract, mainly unreacted 6-(phenoxyacetamido)-2,2 - dimethylpenam-3-carboxylic acid.

These data, obtained from tests under substantially identical conditions, illustrate the process improvement of this invention, involving the influence of the solvent medium in terms of yield of desired desacetoxycephalosporin ester and acid product for a given quantity of pencillin sulfoxide ester starting material, and the same acid substance.

EXAMPLE 14

2,2,2-trichloroethyl 6 - (phenylacetamido)penicillanate sulfoxide was prepared by reacting penicillin G potassium salt [benzylpencillin, potassium salt] with 2,2,2-trichloroethanol in methylene cholride in the presence of pyridine hydrochloride and dicyclohexylcarbodiimide and then reacting the resulting 2,2,2-trichloroethyl 6-(phenylacetamido)penicillanate ester intermediate with 85 percent m-chloroperbenzoic acid in chloroform in an ice bath medium to form the 2,2,2-trichloroethyl 6-(phenylacetamido)penicillanate sulfoxide.

A solution of 1 gram of 2,2,2-trichloroethyl 6-(phenylacetamido)penicillanate sulfoxide and 1.2 g. of acetic anhydride in 50 ml. of N-(propylsulfonyl)piperidine is warmed to 130° C. in an oil bath for about 5 hours to insure complete reaction. The N-(propylsulfonyl)piperidine solvent is removed and the crude product which remains as residue is dissolved in 25 ml. of 90 percent acetic acid and then 5 g. of zinc dust is added to the solution. The resulting mixture is stirred and cooled in an ice bath for three hours to remove the trichloroethyl ester group and to form the corresponding 7-(phenylacetamido)desacetoxycephalosporanic acid [7-(phenylacetamido)-3-methyl-3-cephem-4-carboxylic acid].

EXAMPLE 15

2,2,2-trichloroethyl 6-(thiopheneacetamido)penicillanate sulfoxide was prepared from 6-(thiophene-2-acetamido)penicillanic acid potassium salt following the procedure set forth in Example 14.

A mixture of 1 g. of 2,2,2-trichloroethyl 6-(thiophene-2-acetamido)penicillanate sulfoxide, 1.2 g. of propionic anhydride and sufficient 2-methylisothiazolidine-1,1 - dioxide to make 50 ml. of solution upon warming is heated to 130° C. for effect solution and stirred at that temperature for 4 to 5 hours to insure complete reaction of the penicillin sulfoxide esters. The 2-methylisothiazolidine-1,1-dioxide is removed and the crude product which remains as residue is taken up in 25 ml. of 90 percent acetic acid solution and then 5 grams of zinc dust is added. The resulting mixture is stirred at ice bath temperature to remove the ester group and to form the 7-(thiophene-2-acetamido)desacetoxycephalosporanic acid [7-(thiophene-2-acetamido)-3-methyl-3-cephem-4-carboxylic acid].

EXAMPLE 16

Phenoxyisopropylpenicillin sulfoxide 2,2,2 - trichloroethyl ester was prepared by reacting phenoxyisopropylpenicillin potassium salt with sodium metaperiodate in acidified water solution to form the sulfoxide and reacting the resulting phenoxyisopropylpenicillin sulfoxide as the sodium salt with 2,2,2-trichloroethanol in methylene chloride containing a small amount of pyridine and N,N-dicyclohexylcarbodiimide in an amount equivalent to the penicillin to form the 2,2,2-trichloroethyl phenoxyisopropylpenicillin sulfoxide [2,2,2 - trichloroethyl 6 - ($\alpha,\alpha$-dimethyl-$\alpha$-phenoxyacetamido) - 2,2 - dimethylpenam - 3-carboxylate sulfoxide].

A 3.0 g. (5.7 mmoles) portion of the 2,2,2-trichloroethylphenoxyisopropyl penicillin sulfoxide ester, described above, is dissolved in 120 ml. of warmed tetramethylsulfondiamide containing 2.9 g. (28.5 mmoles) of acetic anhydride. The mixture is heated in an oil bath for about 5 hours to insure complete reaction. The tetramethylsulfondiamide is removed under high vacuum. The crude 2,2,2 -trichloroethyl 7 - ($\alpha,\alpha$ -dimethyl - $\alpha$ - phenoxyacetamido) - 3 - methyl - 3 - cephem - 4 - carboxylate product is dissolved in 90 percent acetic acid and zinc dust as described in Example 3, to obtain the free 7-($\alpha,\alpha$-dimethyl-$\alpha$-phenoxyacetamido) - 3 - methyl - 3 - cephem - 4 - carboxylic acid.

EXAMPLES 17, 18 AND 19

$\alpha,\alpha$-Dimethyl-$\alpha$-phenoxymethylpenicillin sulfoxide p-methoxyphenyl ester (17)

The p-methoxyphenyl 6 - ($\alpha,\alpha$ - dimethyl - $\alpha$ - phenoxyacetamido) - 2,2 - dimethylpenam - 3 - carboxylate sulfoxide was prepared using p-methoxyphenol in place of 2,2,2-trichloroethanol, as described in Example 16. Recrystallization of this ester from chloroform-petroleum ether afforded an analytical sample; M.P. 159° C. to 161° C.; IR and NMR analyses were satisfactory for this pencillin sulfoxide aromatic ester; thin-layer chromatography showed single-spot material.

Analysis.—Calcd. for $C_{25}H_{28}N_2O_7S$ (percent): C, 59.99; H, 5.63; N, 5.59. Found (percent): C, 59.89; H, 5.68; N, 5.48.

$\alpha,\alpha$-Dimethyl-$\alpha$-phenoxymethylpenicillin sulfoxide p-methoxybenzyl ester (18)

The p-methoxybenzyl 6 - ($\alpha,\alpha$ - dimethyl - $\alpha$ - phenoxyacetamido) - 2,2 - dimethylpenam - 3 - carboxylic sulfoxide was prepared using p-methoxybenzyl alcohol in place of 2,2,2-trichloroethanol, as described in Example 16. This ester purified from ethyl acetate-petroleum ether has a M.P. of 163–165° C. IR and NMR analyses were consistent with this penicillin sulfoxide aromatic ester; thin-layer chromatography showed single-spot material.

Analysis.—Calcd. for $C_{26}H_{30}N_2O_7S$ (percent): C, 60.69; H, 5.88; N, 5.45. Found (percent): C, 60.38; H, 5.94; N, 5.54.

$\alpha,\alpha$-Dimethyl-$\alpha$-phenoxypenicillin sulfoxide 2,2-dichloroethyl ester (19)

The 2,2-dichloroethyl 6-($\alpha,\alpha$-dimethyl-$\alpha$-phenoxyacetamido) - 2,2 - dimethylpenam - 3 - carboxylate sulfoxide was prepared as described in Example 16 by using 2,2-dichloroethanol in place of 2,2,2-trichloroethanol. This ester, purified from ethyl acetate-petroleum ether, gave a M.P. of 113° C. to 115° C., IR and NMR analyses were consistent with this penicillin sulfoxide ester; thin-layer chromatography showed single-spot material.

7 - ($\alpha,\alpha$ - Dimethyl - $\alpha$ - phenoxyacetamido) - 3 - desacetoxycephalosporanic acid p - methoxyphenyl ester (17), p-methoxybenzyl ester (18), 2,2-dichloromethyl ester (19)

The p-methoxyphenyl, p-methoxybenzyl, and 2,2-dichloroethyl esters of 7-(α,α-dimethyl-α-phenoxyacetamido)-3-methyl-3-cephem-4-carboxylic acid, are prepared by dissolving the above respective penam sulfoxide esters in N,N-dimethyl-p-tolylsulfonamide, together with from 2 to 5 molar equivalents of acetic anhydride, relative to the respective penam sulfoxide esters therein, and heating the resulting solutions to about 130° C. to 140° C. for about 1 hour.

EXAMPLE 20

2,2,2-trichloroethyl chloroformate

To a solution of phosgene, 40 g. (400 mmoles), in 200 ml. of dry benzene there were added dropwise 2,2,2-trichloroethanol, 15.8 g. (100 mmoles), and pyridine, 12 g. (152 mmoles) in a mixture of 200 ml. of dry benzene and 400 ml. of anhydrous ethyl ether with occasional cooling to keep the temperature slightly below 20° C. The addition required two hours. The precipitated pyridine hydrochloride was filtered off. The filtrate was cooled, poured into 1 liter of ice water and shaken in a separatory funnel. The organic layer was separated, dried over $MgSO_4$, and evaporated in vacuo. Distillation of the residue from over $CaCO_3$ gave a 15 g. (67 percent) yield of the 2,2,2-trichloroethyl chloroformate; B.P. 43° C./10.5 mm.; $[n]=1.4698$; λmax. 5.62μ; the NMR analysis was satisfactory.

Analysis.—Calcd. for $C_3H_2Cl_4O_2$ (percent): Cl, 66.94. Found (percent): Cl, 66.74.

N-(2,2,2-trichloroethyloxycarbonyl)-D-phenylglycine (I)

A solution of D-phenylglycine, 22.7 g. (150 mmoles), in 300 ml. of water, 160 ml. of 1 N NaOH and 150 ml. of ether was cooled in an ice-alcohol bath. While stirring, simultaneous dropwise additions of 2,2,2-trichloroethyl chloroformate, 42.5 g. (200 mmoles) in 200 ml. of dry dioxane and 200 ml. of 1 N NaOH were made. The additions required about one hour. The reaction mixture was maintained near 0° C. for another hour, washed with a large volume of cold ether, and then acidified to pH 2.5 in the presence of cold ethyl acetate. The organic layer was separated, washed with cold water, dried ($MgSO_4$), and evaporated in vacuo. The crystalline solid residue weighed 45 g. and was recrystallized by dissolving in 150 ml. of benzene, filtering, and diluting with 40 ml. of petroleum ether. The yield of pure N-(2,2,2-trichloroethyloxycarbonyl)phenylglycine product was 30.2 g. (62 percent); M.P. 142–144° C.; electrometric titration in 66 percent aqueous dimethylformamide showed a pK′a=5.55 and an apparent molecular weight=332 (calcd. 327); the NMR analysis was satisfactory.

Analysis.—Calcd. for $C_{11}H_{10}Cl_3NO_4$ (percent): C, 40.45; H, 3.09; N, 4.29. Found (percent): C, 40.60; H, 3.24; N, 4.55.

6-[N-(2,2,2-trichloroethylcarbonyl)-D-phenylglycyl]aminopenicillanic acid (II)

2,2,2-trichloroethyl chloroformate, 11.6 g. (85.0 mmoles), was dissolved in 420 ml. of analytical grade acetone containing a few drops of dimethylbenzylamine and cooled in an ice-alcohol bath. While stirring, N-(2,2,2-trichloroethoxycarbonyl)-D-phenylglycine, 28.0 g. (85.0 mmoles), and triethylamine, 8.7 g. (86.0 mmoles) in 420 ml. of acetone were added dropwise over a period of thirty minutes to form the N-(2,2,2-trichloroethoxycarbonyl)-D-phenylglycyl 2,2,2-trichloroethyl carbonate. The mixture was stirred in the cold an additional fifteen minutes. 6-aminopenicillanic acid (6-APA), 18.6 g. (85.0 mmoles), in 70 ml. of cold water containing triethylamine, 8.7 g. (86.0 mmoles), was added in one portion to the reaction. The mixture was stirred in the cold for two hours, concentrated in vacuo to remove the acetone and diluted with a volume of water. The aqueous solution was layered with ethyl acetate, cooled, and acidified to pH 2.5 with 1 N HCl. The ethyl acetate was separated, washed with cold water, and back-titrated into water to pH 6.7 with 1 N NaOH to form the sodium salt. The aqueous salt-containing layer was separated, filtered, and evaporated to dryness in vacuo. The residue, after trituration with dry acetone, was a white amorphous powder, weighing 24.6 g. (53 percent yield); electrometric titration in 66 percent aqueous dimethylformamide showed a pK′a=5.25 and an apparent molecular weight= 539 (calcd. 547); IR and NMR were as expected for the desired product.

6-[N-(2,2,2-trichloroethoxycarbonyl)-D-phenylglycyl]aminopenicillanic acid sulfoxide (III)

An 18 g. portion of 6-[N-(2,2,2-trichloroethoxylcarbonyl)-D-phenylglycyl]aminopenicillanic acid sodium salt was dissolved in 300 ml. of water. The pH of the solution was adjusted to 5.4 with 1 N HCl. Sodium metaperiodate, 7.1 g. (33 mmoles), was added portionwise and the mixture was stirred at room temperature for two hours, acidified to pH 2.5 in the cold and in the presence of ethyl acetate. The organic layer containing the penicillin sulfoxide was separated, washed with cold, water, dried over $MgSO_4$ and evaporated in vacuo. The crude penicillin sulfoxide residue weighed 16 g. Crystallization was effected by dissolving the product in 64 ml. of N,N-dimethylacetamide and diluting with 640 ml. of anhydrous ether, filtering, and diluting slowly with 40 ml. of petroleum ether. The yield of pure 6-α-[N-(2,2,2-trichloroethoxycarbonyl)amino]-α-phenylacetamido-2,2-dimethylpenam-3-carboxylic acid sulfoxide product was 11.6 g. (56 percent); M.P. 153–155° C. As evidenced by NMR and IR analysis, this product was solvated with one mole of dimethylacetamide.

Analysis.—Calcd. for $C_{19}H_{20}Cl_3N_3O_7S \cdot C_4H_9NO$ (percent): C, 43.99; H, 4.65; N, 8.92. Found (percent): C, 44.26; H, 5.02; N, 8.65.

6-[N-(2,2,2-trichloroethoxycarbonyl)-D-phenylglycyl] aminopenicillanic acid sulfoxide 2,2,2-trichloroethyl ester (IV)

A 7 g. (11.2 mmoles) portion of 6-[N-(2,2,2-trichloroethoxycarbonyl)-D-phenylglycylamido]-2,2-dimethylpenam-3-carboxylic acid sulfoxide was dissolved in 85 ml. of dry tetrahydrofuran (THF) containing pyridine, 1.77 g. (22.3 mmoles). The solution was cooled in an ice-alcohol bath and stirred while adding 2,2,2-trichloroethyl chloroformate, 3.6 g. (16.7 mmoles), in 20 ml. of THF. The mixture was stirred in the cold for two hours, at room temperature for three hours, and heated to gentle reflux for fifteen minutes. The solvent was removed in vacuo. The amine-protected-D-phenylglycylpenicillin sulfoxide ester residue was taken up in cold ethyl acetate for successive washes with water, 5 percent $NaHCO_3$ solution, and water. The ethyl acetate solution was dried ($MgSO_4$) and evaporated in vacuo, giving 5.2 g. of an amorphous solid. Crystallization from 7 ml. of ethanol gave a 4.5 g. (59 percent) yield of 2,2,2-trichloroethyl 6-[N-(2,2,2-trichloroethoxycarbonyl)-D-phenylglycylamido]-2,2-dimethylpenam-3-carboxylate sulfoxide ester product; M.P. 180–182° C. A 1-gram sample of this product was recrystallized from ethanol-water for analysis; M.P. 185–186° C.

Analysis.—Calcd. for $C_{21}H_{21}Cl_6N_3O_7S$ (percent): C, 37.51; H, 3.14; N, 6.25. Found (percent): C, 37.96; H, 3.39; N, 6.02.

7-(α-aminophenylacetamido)-3-desacetoxycephalosporanic acid (V)

A 3.2 g. (4.5 mmoles) portion of the 2,2,2-trichloroethyl-6-[N-(2,2,2-trichloroethoxycarbonyl)-D-phenylglycylamido]-2,2-dimethylpenam-3-carboxylate sulfoxide ester is dissolved in 120 ml. of N,N-dimethylmethanesulfonamide solvent containing acetic anhydride, 2.3 g. (22.5 mmoles), and heated in an oil bath at 135° C. for one hour to effect rearrangement. The solvent and excess acid reagent are removed under high vacuum. The residual oil is taken up in 50 ml. of 95 percent acetic acid and cooled in ice. Zinc dust, 10 g. (153 mmoles), is added and the mixture is stirred in the cold for three hours to remove the blocking group from the glycyl amino nitrogen. The reaction mixture was filtered. The zinc is washed with two volumes of acetic acid. The wash and filtrate are combined and concentrated to dryness in vacuo. The crude desacetoxycephalosporin residue is taken up in 100 ml. water, cooled, and acidified to pH 1 with trifluoroacetic acid, and the desacetoxycephaloglycin trifluoroacetic acid salt is extracted with methylisobutyl ketone. The organic solvent is dried ($MgSO_4$) and evaporated in vacuo, and the residue triturated with anhydrous ethyl ether, giving the trifluoroacetic acid salt of desacetoxycephaloglycin as a pink, amorphous powder. A bioautograph of this product (against a *Bacillus subtilis* seeded agar plate) of a paper chromatogram developed with butanol, acetic acid, water (3:1:1) shows a single biologically active spot corresponding exactly in $R_f$ value with that of desacetoxycephaloglycin [7 - (D - phenylglycylamido)-3-methyl-3-cephem-4-carboxylic acid] prepared by an alternate synthesis. The NMR analysis showed the C-3-methyl absorption band characteristic of desacetoxycephalosporins as a singlet at $\tau7.90$.

EXAMPLE 21

A 1-gram portion of 2,2,2-trichloroethylheptylmercaptomethylpenicillin sulfoxide ester, obtained by reacting heptylmercaptomethylpencillin potassium salt with 2,2,2-trichloroethanol in methylene dichloride, and then treating the resulting ester with sodium metaperiodate at ice bath temperatures to form the 2,2,2-trichloroethyl heptylmercaptomethylpenicillin sulfoxide, is dissolved in 50 ml. of warmed N,N-diethylbenzenesulfonamide with 1.5 grams of aluminum chloride. The resulting mixture is warmed to 95° C. for 1 hour to form the 2,2,2-trichloroethyl 7-(heptylmercaptoacetamido) - 3 - methyl - 3 - cephem-4-carboxylate ester. Most of the N,N-diethylbenzenesulfonamide is removed under vacuum and the crude cephem ester product is taken up in 90 percent acetic acid and treated with zinc dust at 0° C. to 20° C. to remove the ester group and to form the 7-(heptylmercaptoacetamido)-3-methyl-3-cephem-4-carboxylic acid antiobiotic.

EXAMPLE 22

2,2,2-trichloroethyl 6 - (phenylacetamido)penicillanate sulfoxide was prepared by reacting pencillin G potassium salt [benzylpenicillin, potassium salt] with 2,2,2-trichloroethanol in methylene chloride in the presence of pyridine hydrochloride and dicyclohexylcarbodiimide, and then reacting the resulting 2,2,2-trichloroethyl 6-(phenylacetamido)penicillanate ester intermediate with 85 percent m-chloroperbenzoic acid in chloroform in an ice bath medium to form the 2,2,2-trichloroethyl 6-(phenylacetamido)penicillanate sulfoxide.

A solution of 1 gram of 2,2,2-trichloroethyl 6-(phenylacetamido)pencillanate sulfoxide and 1.2 g. of acetic anhydride in 50 ml. of tetraethylurea is warmed to 130° C. in an oil bath for about 5 hours to insure complete reaction. The tetraethylurea solvent is removed and the crude product which remains as residue is dissolved in 25 ml. of 90 percent acetic acid and then 5 g. of zinc dust is added to the solution. The resulting mixture is stirred and cooled in an ice bath for three hours to remove the trichloroethyl ester group and to form the corresponding 7-(phenylacetamido)desacetoxycephalosporanic acid [7-(phenylacetamido)-3-methyl-3-cephem-4-carboxylic acid].

EXAMPLE 23

2,2,2 - trichloroethyl 6 - (thiopheneacetamido)penicilanate sulfoxide was prepared from 6-(thiophene-2-acetamido)penicillanic acid potassium salt following the procedure set forth in Example 22.

A mixture of 1 g. of 2,2,2-trichloroethyl 6-(thiophene-2-acetamido)penicillanate sulfoxide, 1.2 g. of propionic anhydride and sufficient N,N-dimethylcarbanilide to make 50 ml. of solution upon warming is warmed to 130° C. for effect solution and stirred at that temperature for 4 to 5 hours to insure complete reaction of the penicillin sulfoxide ester. The N,N-dimethylcarbanilide is removed and the crude product which remains as residue is taken up in 25 ml. of 90 percent acetic acid solution and then 5 grams of zinc dust is added. The resulting mixture is stirred at ice bath temperature to remove the ester group and to form the 7-(thiophene-2-acetamido)desacetoxycephalosporanic acid [7 - (thiophene - 2 - acetamido)-3-methyl-3-cephem-4-carboxylic acid].

EXAMPLE 24

Phenoxyisopropylpenicillin sulfoxide 2,2,2 - trichloroethyl ester was prepared by reacting phenoxyisopropylpenicillin potassium salt with sodium metaperiodate in acidified water solution to form the sulfoxide, and reacting the resulting phenoxyisopropylpenicillin sulfoxide as the sodium salt with 2,2,2-trichloroethanol in methylene chloride containing a small amount of pyridine and N,N-dicyclohexylcarbodiimide in an amount equivalent to the pencillin to form the 2,2,2-trichloroethyl phenoxyisopropylpenicillin sulfoxide [2,2,2-trichloroethyl 6-(α,α-dimethyl-α-phenoxyacetamido) - 2,2 - dimethylpenam-3-carboxylate sulfoxide].

A 3.0 g. (5.7 mmoles) portion of the 2,2,2-trichloroethyl phenoxyisopropyl penicillin sulfoxide ester, described above, is dissolved in 120 ml. of warmed N,N-dimethyl-N',N'-diethylurea containing 2.9 g. (28.5 mmoles) of acetic anhydride. The mixture is heated in an oil bath for about 5 hours to insure complete reaction. The N,N-dimethyl-N',N'-diethylurea is removed under high vacuum. The crude 2,2,2-trichloroethyl 7-(α,α-dimethyl-α-phenoxyacetamido)-3-methyl-3-cephem-4-carboxylate product is dissolved in 90 percent acetic acid and the zinc dust as described in Example 21, to obtain the free 7-(α,α-dimethyl-α-phenoxyacetamido)-3-methyl - 3 - cephem-4-carboxylic acid.

EXAMPLES 25, 26, AND 27

α,α-Dimethyl-α-phenoxymethylpenicillin sulfoxide p-methoxy phenyl ester (25)

The p-methoxyphenyl 6-(α,α-dimethyl-α-phenoxyacetamido)-2,2-dimethylpenam-3-carboxylate sulfoxide was prepared using p-methoxyphenol in place of 2,2,2-trichloroethanol, as described in Example 16. Recrystallization of this ester from chloroform-petroleum ether afforded an analytical sample; M.P. 159° to 161° C.; IR and NMR analyses were satisfactory for this penicillin sulfoxide aromatic ester; thin-layer chromatography showed single-spot material.

*Analysis.*—Calcd for $C_{25}H_{28}H_2O_7S$ (percent): C, 59.99; H, 5.63; N, 5.59. Found (percent): C, 59.89; H, 5.68; N, 5.48.

α,α-Dimethyl-α-phenoxymethylpenicillin sulfoxide p-methoxybenzyl ester (26)

The p-methoxybenzyl 6-(α,α-dimethyl-α-phenoxyacetamido)-2,2-dimethylpenam-3-carboxylate sulfoxide was prepared using p-methoxybenzyl alcohol in place of 2,2,2-trichloroethanol, as described in Example 16. This ester purified from ethyl acetate-petroleum ether has a M.P. of 163° to 165° C. IR and NMR analyses were consistent with this penicillin sulfoxide aromatic ester; thin-layer chromatography showed single-spot material.

*Analysis.*—Calcd. for $C_{26}H_{30}N_2O_7S$ (percent): C, 60.69; H, 5.88; N, 5.45. Found (percent): C, 60.38; H, 5.94; N, 5.54.

α,α-Dimethyl-α-phenoxypenicillin sulfoxide 2,2-dichloroethyl ester (27)

The 2,2-dichloroethyl 6-(α,α-dimethyl-α-phenoxyacetamido)-2,2-dimethylpenam-3-carboxylate sulfoxide was prepared as described in Example 16 by using 2,2-dichloroethanol in place of 2,2,2-trichloroethanol. This ester, purified from ethyl acetate-petroleum ether, gave a M.P. of 113° to 115° C., IR and NMR analyses were consistent with this penicillin sulfoxide ester; thin-layer chromatography showed single-spot material.

7-(α,α-dimethyl-α-phenoxyacetamido) - 3 - desacetoxycephalosporanic acid p-methoxyphenyl ester (25), p-methoxybenzyl ester (26), 2,2-dichloromethyl ester (27)

The p-methoxyphenyl, p-methoxybenzyl, and 2,2-dichloroethyl esters of 7-(α,α-dimethyl - α - phenoxyacetamido)-3-methyl-3-cephem-4-carboxylic acid, are prepared by dissolving the above respective penam sulfoxide esters in tetramethylurea, together with from 2 to 5 molar equivalents of acetic anhydride, relative to the respective penam sulfoxide esters therein and heating the resulting solutions to about 130° to 140° C. for about 1 hour.

EXAMPLE 28

2,2,2-trichloroethyl chloroformate

To a solution of phosgene, 40 g. (400 mmoles), in 200 ml. of dry benzene there were added dropwise 2,2,2-trichloroethanol, 15.8 g. (100 mmoles), and pyridine, 12 g. (152 mmoles) in a mixture of 200 ml. of dry benzene and 400 ml. of anhydrous ethyl ether with occasional cooling to keep the temperature slightly below 20° C. The addition required two hours. The precipitated pyridine hydrochloride was filtered off. The filtrate was cooled, poured into 1 liter of ice-water, and shaken in a separatory funnel. The organic layer was separated, dried over $MgSO_4$, and evaporated in vacuo. Distillation of the residue from over $CaCO_3$ gave a 15 g. (67 percent) yield of the 2,2,2-trichloroethyl chloroformate; B.P. 43° C./10.5 mm.; [n]=1.4698; λmax. 5.62μ; the NMR analysis was satisfactory.

Analysis.—Calcd. for $C_3H_2Cl_4O_2$ (percent): Cl, 66.94. Found (percent): Cl, 66.74.

N-(2,2,2-trichloroethyloxycarbonyl)-D-α-phenyl glycine (I)

A solution of D-phenylglycine, 22.7 g. 150 mmoles), in 300 ml. of water, 160 ml. of 1 N NaOH and 150 ml. of ether was cooled in an ice-alcohol bath. While stirring, simultaneous dropwise additions of 2,2,2-trichloroethyl chloroformate, 42.5 g. (200 mmoles) in 200 ml. of dry dioxane and 200 ml. of 1 N NaOH were made. The additions required about one hour. The reaction mixture was maintained near 0° C. for another hour, washed with a large volume of cold ether, and then acidified to pH 2.5 in the presence of cold ethyl acetate. The organic layer was separated, washed with cold water, dried ($MgSO_4$), and evaporated in vacuo. The crystalline solid residue weighed 45 g. and was recrystallized by dissolving in 150 ml. of benzene, filtering, and diluting with 40 ml. of petroleum ether. The yield of pure N-(2,2,2-trichloroethoxycarbonyl)phenylglycine product was 30.2 g. (62 percent); M.P. 142° to 144° C.; electrometric titration in 66 percent aqueous dimethylformamide showed a pK'a=5.55 and an apparent molecular weight=332 (calcd. 327); the NMR analysis was satisfactory.

Analysis.—Calcd. for $C_{11}H_{10}Cl_3NO_4$ (percent): C, 40.45; H, 3.09; N, 4.29. Found (percent): C, 40.60; H, 3.24; N, 4.55.

6-[N-(2,2,2-trichloroethylcarbonyl)-D-phenylglycyl] aminopenicillanic acid (II)

2,2,2-trichloroethyl chloroformate, 11.6 g. (85.0 mmoles), was dissolved in 420 ml. of analytical grade acetone containing a few drops of dimethylbenzylamine and cooled in an ice-alcohol bath. While stirring, N-(2,2,2-trichloroethoxycarbonyl)-D-phenylglycine, 28.0 g. (85.0 mmoles), and triethylamine, 8.7 g. (86.0 mmoles) in 420 ml. of acetone were added dropwise over a period of thirty minutes to form the N-(2,2,2-trichloroethoxycarbonyl)- D-α-phenylglycyl 2,2,2-trichloroethyl carbonate. The mixture was stirred in the cold an additional fifteen minutes. 6-aminopenicillanic acid (6-APA), 18.6 g. (85.0 mmoles), in 70 ml. of cold water containing triethylamine, 8.7 g. (86.0 mmoles), was added in one portion to the 2,2,2-trichloroethyl carbonate. The mixture was stirred in the cold for two hours, concentrated in vacuo to remove the acetone and diluted with a volume of water. The aqueous solution was layered with ethyl acetate, cooled, and acidified to pH 2.5 with 1 N HCl. The ethyl acetate was separated, washed with cold water, and back-titrated into water to pH 6.7 with 1 N NaOH to form the sodium salt. The aqueous salt-containing layer was separated, filtered and evaporated to dryness in vacuo. The residue, after trituration with dry acetone, was a white amorphous powder, weighing 24.6 g. (53 percent yield); electrometric titration in 66 percent aqueous dimethylformamide showed a pK'a=5.25 and an apparent molecular weight=539 (calcd. 547); IR and NMR were as expected for the desired product.

6-[N-(2,2,2-trichloroethoxycarbonyl)-D-phenylglycyl] amidopenicillanic acid sulfoxide (III)

An 18 g. portion of 6-{α-[N-(2,2,2-trichloroethoxycarbonyl)amino] - α - phenylglycylamido}-2,2,-dimethylpenam-3-carboxylic acid sodium salt was dissolved in 300 ml. of water. The pH of the solution was adjusted to 5.4 with 1 N HCl. Sodium metaperiodate, 7.1 g. (33 mmoles), was added portionwise and the mixture was stirred at room temperature for two hours, acidified to pH 2.5 in the cold and in the presence of ethyl acetate. The organic layer containing the penicillin sulfoxide was separated, washed with cold water, dried over $MgSO_4$ and evaporated in vacuo. The crude penicillin sulfoxide residue weighed 16 g. Crystallization was effected by dissolving the product in 64 ml. of N,N-dimethylacetamide and diluting with 640 ml. of anhydrous ether, filtering, and diluting slowly with 40 ml. of petroleum ether. The yield of pure 6-{α-[N-(2,2,2 - trichloroethoxycarbonyl)amino] - α - phenylacetamido} - 2,2 - dimethylpenam-3-carboxylic acid sulfoxide product was 11.6 g. (56 percent); M.P. 153–155° C. As evidenced by NMR and IR analysis, this product was solvated with one mole of dimethylacetamide.

Analysis.—Calcd. for $C_{19}H_{20}Cl_3N_3O_7S \cdot C_4H_9NO$ (percent): C, 43.99; H, 4.65; N, 8.92. Found (percent): C, 44.26; H, 5.02; N, 8.65.

6 - [N - (2,2,2-trichloroethoxycarbonyl)-D-phenylglycyl] aminopenicillanic acid sulfoxide 2,2,2-trichloroethyl ester (IV)

A 7 g. (11.2 mmoles) portion of 6-[N-(2,2,2-trichloroethoxycarbonyl) - D - phenylglycylamido]-2,2-dimethylpenam-3-carboxylic acid sulfoxide was dissolved in 85 ml. of dry tetrahydrofuran (THF) containing pyridine, 1.77 g. (22.3 mmoles). The solution was cooled in an ice-alcohol bath and stirred while adding 2,2,2-trichloroethyl chloroformate, 3.6 g. (16.7 mmoles), in 20 ml. of THF. The mixture was stirred in the cold for two hours, at room temperature for three hours, and heated to gentle reflux for fifteen minutes. The solvent was removed in vacuo. The amine-protected D-phenylglycylpenicillin sulfoxide ester residue was taken up in cold ethyl acetate for successive washes with water, 5 percent $NaHCO_3$ solution, and water. The ethyl acetate solution was dried ($MgSO_4$) and evaporated in vacuo, giving 5.2 g. of an amorphous solid. Crystallization from 7 ml. of ethanol gave a 4.5 g. (59 percent) yield of 2,2,2-trichloroethyl 6-[N-(2,2,2-trichloroethoxycarbonyl) - D - α-phenylglycylamido]-2,2-dimethylpenam-3-carboxylate sulfoxide ester product; M.P. 180° to 182° C. A 1-gram sample of this product was recrystallized from ethanol-water for analysis; M.P. 185° to 186° C.

Analysis.—Calcd. for $C_{21}H_{21}Cl_6N_3O_7S$ (percent): C, 37.51; H, 3.14; N, 6.25. Found (percent): C, 37.96; H, 3.39; N, 6.02.

7-(α-aminophenylacetamido)-3-desacetoxy-cephalosporanic acid (V)

A 3.2 g. (4.5 mmoles) portion of the 2,2,2-trichloroethyl 6 - [N-(2,2,2-trichloroethoxycarbonyl)-D-α-phenylglycylamido]-2,2-dimethylpenam-3-carboxylate sulfoxide ester is dissolved in 120 ml. of tetramethylurea solvent containing acetic anhydride, 2.3 g. (22.5 mmoles), and heated in an oil bath at 135° C. for one hour to effect rearrangement. The solvent and excess acid reagent are removed under high vaccum. The residual oil is taken up in 50 ml. of 95 percent acetic acid and cooled in ice. Zinc dust, 10 g. (153 mmoles), is added and the mixture is stirred in the cold for three hours to remove the blocking group from the glycyl amino nitrogen. The reaction mixture is filtered. The zinc is washed with two volumes of acetic acid. The wash and filtrate are combined and concentrated to dryness in vacuo. The crude desacetoxycephalosporin residue is taken up in 100 ml. water, cooled, and acidified to pH 1 with trifluoroacetic acid, and the desacetoxycephaloglycin trifluoroacetic acid salt is extracted with methyl isobutyl ketone. The organic solvent is dried over magnesium sulfate and evaporated in vacuo, and the residue is triturated with anhydrous ethyl ether, giving the trifluoroacetic acid salt of desacetoxycephaloglycin as a pink, amorphous powder. A bioautograph of this product (against a *Bacillus subtilis* seeded agar plate) of a paper chromatogram developed with butanol, acetic acid, water (3:1:1) shows a single biologically active spot corresponding exactly in $R_f$ value with that of desacetoxycephaloglycin [7 - (D - phenylglycylamido)-3-methyl-3-cephem-4-carboxylic acid] prepared by an alternate synthesis. The NMR analysis shows the C-3 methyl absorption band characteristic of desacetoxycephalosporins as a singlet at τ7.90.

EXAMPLE 29

A 0.55 g. portion of the p-methoxybenzyl phenylmercapto-methyl penicillin sulfoxide ester, obtained by reacting phenylmercaptomethylpenicillin potassium salt with p-methoxybenzyl alcohol to form the ester p-methoxybenzyl ester, and then reacting this penicillin ester with sodium metaperiodate to form the p-methoxybenzyl phenylmercaptomethylpenicillin sulfoxide ester, is dissolved in 50 ml. of 1,3-dimethyl-2-imidazolidone using acetic anhydride to provide acid conditions, and heated to 110° C. for 1 hour to form the p-methoxybenzyl 7-(phenylmercaptoacetamido) - 3 - methyl-3-cephem-4-carboxylate. This cephem ester is taken up in 90 percent acetic acid solution and treated with zinc dust, which mixture is stirred on an ice bath for 1 hour to remove the p-methoxybenzyl group and to form the 7-(phenylmercaptoacetamido) - 3 - methyl-3-cephem-4-carboxylic acid antibiotic.

EXAMPLE 30

2,2,2 - trichloroethyl 6 - (2' - chloro - 2' - phenylacetamido)penicillanate sulfoxide was prepared by esterifying 6 - (2' - chloro - 2' - phenylacetamido)penicillanic acid potassium salt with 2,2,2-trichloroethyl chloroformate and then forming the sulfoxide by reacting the ester with chloroperbenzoic acid in chloroform in an ice bath. A portion of the 2,2,2 - trichloroethyl 6 - (2' - chloro-2'-phenylacetamido)penicillanate sulfoxide is dissolved in about 50 ml. of warmed 1,1' - carbonyldipyrrolidine with p-toluenesulfonic acid being added in slight molar excess relative to the penicillin sulfoxide ester to provide acid conditions. The mixture is heated to about 120° C. for about 1 hour to form 2,2,2-trichloroethyl 7-(2'-chloro-2' - phenylacetamido) - 3 - methyl - 3 - cephem - 4 - carboxylate. After removing most of the 1,1' - carbonyldipyrrolidine, the crude residue cephem ester product is taken up in 90 percent acetic acid solution, zinc dust is added, and the mixture is stirred for about 2 hours to remove the ester group and to form the 7-(2'-chloro-2-phenylacetamido) - 3 - methyl - 3 - cephem - 4 - carboxylic acid antibiotic.

EXAMPLE 31

In separate runs made under substantially identical conditions, 1 gram portions of 2,2,2-trichloroethyl phenoxymethylpenicillin sulfoxide [6 - (phenoxyacetamido)-2,2 - dimethylpenam - 3 - carboxylate sulfoxide] were dissolved in 10 ml. of (a) N,N-dimethylcarbanilide or (b) xylene, each solvent (a) and (b) containing 1 ml. of acetic anhydride as the acid substance. The respective mixtures were heated at 135° C. for about 1 hour to effect rearrangement of the penicillin sulfoxide ester to the corresponding 2,2,2 - trichloroethyl 7 - (phenoxyacetamido)-3-methyl-3-cephem-4-carboxylate.

The resulting reaction mixtures were cooled to room temperature, diluted with 75 ml. of tetrahydrofuran, and then 4 g. of zinc dust and 5 ml. of 90 percent acetic acid were added. The resulting mixtures were stirred at room temperature for about 2 hours.

The respective solutions were then filtered to remove zinc, the precipitate was washed with 100 ml. ethyl acetate. Then 200 ml. of water was added to the filtrates and the pH was adjusted to 7.5 with sodium bicarbonate. The aqueous phase was extracted with two 100 ml. portions of ethyl acetate, acidified to pH 2.5 and then re-extracted with two 100 ml. portions of ethyl acetate. The ethyl acetate extracts containing the acid product were combined and washed with three 100 ml. portions of water. The ethyl acetate solution of the product was then dried over magnesium sulfate, and then the solvent was removed in vacuo to leave the product as a solid residue. The respective weights of acid product obtained were

| Solvent run: | Weight of acid product, mg. |
|---|---|
| (a) N,N-dimethylcarbanilide | 350 |
| (b) Xylene | 210 |

Samples of the above acid products were tested by bioautograph procedures, referred to in Example 1, to determine the identity and amount of the desacetoxycephalosporin in the acid product. The amounts of 7-(phenoxyacetamido) - 3 - methyl - 3 - cephem - 4 - carboxylic acid present in each acid product (a) and (b) above were compared by the size of the bioautograph spot given by the respective acid products (a) and (b), compared to the bioautograph spot given by pure 7-(phenoxyacetamido) - 3 - methyl - 3 - cephem - 4 - carboxylic acid (standard) in the same test run at the same time. The ratio of the size of the test acid product spots to the size of the spot of the standard permits the calculation of the amount of desired 7 - (phenoxyacetamido) - 3 - methyl - 3 - cephem - 4 - carboxylic acid in the respective acid products. The amounts so calculated were (a) N,N-dimethylcarbanilide, 154 mg., (b) xylene, trace, mainly unreacted 6 - (phenoxyacetamido) - 2,2-dimethylpenam-3-carboxylic acid.

These data, obtained from tests under substantially identical conditions, illustrate the process improvement of this invention involving the influence of the solvent medium in terms of yield of desired desacetoxycephalosporin ester and acid product for a given quantity of penicillin sulfoxide ester starting material and the same acid substance.

I claim:

1. In a process for converting a penicillin sulfoxide ester to antibiotic substances by heating the penicillin sulfoxide ester under acid conditions for a time sufficient to effect conversion thereof, the improvement which comprises heating the penicillin sulfoxide ester dissolved in a solvent medium selected from the group consisting of a tertiary carboxamide, a tertiary urea derivative, a tertiary sulfonamide, and mixtures thereof, at a temperature of from about 80° C. to about 175° C., which solvent media being further defined in that they have structural formulas as follows:

(a) a tertiary carboxamide of the formula

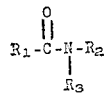

wherein (1) $R_1$ is hydrogen and each of $R_2$ and $R_3$ is alkyl, phenyl, tolyl, or xylyl such that $R_2$ and $R_3$ together contain up to about 14 carbon atoms;

(2) at least one of $R_1$, $R_2$, and $R_3$ is alkyl, and not more than two of $R_1$, $R_2$, and $R_3$ are phenyl, tolyl, or xylyl, and $R_1$, $R_2$, and $R_3$ together contain up to about 18 carbon atoms;

(3) $R_1$ is hydrogen or an alkyl group, and $R_2$ and $R_3$ are taken together with the nitrogen atom to which they are bonded to form a saturated monocyclic ring radical which contains from 4 to 6 saturated carbon atoms in the ring and which ring can contain an oxygen atom gamma to the nitrogen as a ring member, and a total of up to about 12 carbon atoms in $R_1$, $R_2$, and $R_3$; and/or (4) $R_1$ and $R_2$ are taken together with the amide grouping

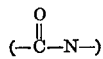

to which they are bonded to form a carbonyl containing monocyclim ring having from 4 to 6 carbon atoms, and $R_3$ is alkyl, phenyl, tolyl, or xylyl, such that $R_1$, $R_2$, and $R_3$ together contain up to about 12 carbon atoms.

(b) a tertiary urea derivative of the formula

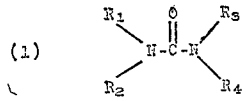

wherein $R_1$, $R_2$, $R_3$, and $R_4$ are alkyl, phenyl, tolyl, xylyl, such that $R_1$, $R_2$, $R_3$, and $R_4$ contain a combined total of up to about 18 carbon atoms.

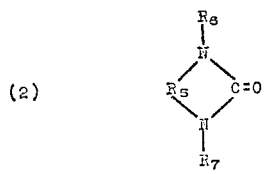

wherein $R_5$ is a bivalent alkylene radical having from 2 to 3 ring carbon atoms which alkylene radical is bonded to the nitrogens from different carbon atoms thereof, and each of $R_6$ and $R_7$ is an alkyl, phenyl, tolyl, or xylyl such that $R_5$, $R_6$, and $R_7$ have a combined total of up to about 12 carbon atoms and

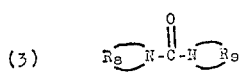

wherein each of $R_8$ and $R_9$ completes with the nitrogen to which is bonded a monocyclic mononitrogen ring containing from 5 to 6 ring forming members, one of which ring members may be oxygen gamma to the ring nitrogen, the remaining ring members being saturated carbon atoms; and (c) a tertiary sulfonamide of the formula

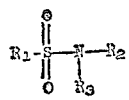

wherein (1) each of $R_1$, $R_2$, and $R_3$ is $C_1$ to $C_{10}$ alkyl, phenyl, tolyl, or xylyl, at least one of $R_1$, $R_2$, and $R_3$ is $C_1$ to $C_{10}$ alkyl and $R_1$, $R_2$, and $R_3$ together contain not more than 18 carbon atoms;

(2) $R_1$ is a $C_1$ to $C_{10}$ alkyl, phenyl, tolyl, or xylyl, and $R_2$ and $R_3$ are taken together with the nitrogen atom to which they are bonded to complete a monocyclic ring radical bonded to the sulfur atom, which radical contains from 4 to 6 saturated carbon atoms, and which radical can contain a ring member oxygen atom gamma to the ring nitrogen, such that $R_1$, $R_2$ and $R_3$ together contain up to about 12 carbon atoms;

(3) $R_1$ and $R_2$ are taken together with the sulfonamide grouping to which they are bonded to form a sulfur oxide and mononitrogen monocyclic ring having from 3 to 5 saturated ring carbon atoms therein, and $R_3$ is alkyl, phenyl, tolyl, or xylyl such that $R_1$, $R_2$, and $R_3$ together contain up to about 12 carbon atoms, and/or (4) $R_1$ is —$NR_4R_5$ and each $R_2$, $R_3$, $R_4$, and $R_5$ is alkyl such that the sulfondiamide formed thereby contains up to about 12 carbon atoms.

2. In a process for converting a penicillin sulfoxide ester to antibiotic substances by heating the penicillin sulfoxide ester under acid conditions for a time sufficient to effect conversion thereof, the improvement which comprises heating the penicillin sulfoxide ester dissolved in a tertiary carboxamide at a temperature of from about 80° C. to about 175° C. which tertiary carboxamide has the structural formula

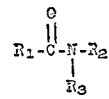

wherein (a) $R_1$ is hydrogen and each of $R_2$ and $R_3$ is alkyl, phenyl, tolyl, or xylyl such that $R_2$ and $R_3$ together contain up to about 14 carbon atoms;

(b) at least one of $R_1$, $R_2$, and $R_3$ is alkyl, and not more than two of $R_1$, $R_2$, and $R_3$ are phenyl, tolyl, xylyl, and $R_1$, $R_2$, and $R_3$ together contain up to about 18 carbon atoms;

(c) $R_1$ is hydrogen or an alkyl group, and $R_2$ and $R_3$ are taken together with the nitrogen atom to which they are bonded to form a saturated monocyclic ring radical which contains from 4 to 6 saturated carbon atoms in the ring and which ring can contain an oxygen atom gamma to the nitrogen as a ring member, and a total of up to about 12 carbon atoms in $R_1$, $R_2$, and $R_3$; and/or (d) $R_1$ and $R_2$ are taken together with the amide grouping

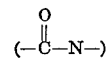

to which they are bonded to form a carbonyl containing monocyclic ring having from 4 to 6 carbon atoms, and $R_3$ is alkyl, phenyl, tolyl, or xlyl, such that $R_1$, $R_2$, and $R_3$ together contain up to about 12 carbon atoms.

3. A process as defined in claim 2 wherein the tertiary carboxamide is one wherein $R_1$ is hydrogen, and each of $R_2$ and $R_3$ is alkyl, phenyl, tolyl, or xylyl such that $R_2$ and $R_3$ together contain up to about 14 carbon atoms.

4. A process as defined in claim 3 wherein the tertiary carboxamide is N,N-dimethylformamide.

5. A process as defined in claim 2 wherein the tertiary carboxamide is one wherein at least one of $R_1$, $R_2$, and $R_3$ is alkyl and not more than two of $R_1$, $R_2$, and $R_3$ are phenyl, tolyl, or xylyl, and $R_1$, $R_2$, and $R_3$ together contain up to about 18 carbon atoms.

6. A process as defined in claim 5 wherein the tertiary carboxamide is N,N-diethyl-m-toluamide.

7. A process as defined in claim 3 wherein the tertiary carboxamide is N,N-diphenylformamide.

8. A process which comprises (a) dissolving in a member of the group consisting of dimethylformamide, dimethylacetamide, and mixtures thereof, a 6-[N-(blocked amino)-D-phenylglycylamido] - 2,2 - dimethylphenam-3-carboxylic acid sulfoxide ester, said ester being selected from the group consisting of 2,2,2-trichloroethyl, p-methoxyphenyl, and p-methoxybenzyl, and acetic anhydried in molar excess relative to said ester, (b) heating the resulting solution from step (a) to from about 90° C. to about 150° C. to form the corresponding 7-[N-(blocked amino) - D - phenylglycylamido] - 3 - methyl-3-cephem-4-carboxylic ester, and (c) recovering the corresponding 7-(D-phenylglycylamido)-3-methyl-3-cephem-4-carboxylic acid from the respective ester obtained in step (b).

9. A process which comprises (a) dissolving in a member of the group consisting of dimethylformamide, dimethylacetamide, and mixtures thereof, a 6-(2'-phenylacetamido)-2,2-dimethylpenam-3-carboxylic acid sulfoxide ester, said ester being selected from the group consisting of 2,2,2-trichloroethyl, p-methoxyphenyl, and p-methoxybenzyl and acetic anhydride in molar excess relative to said ester, (b) heating the resulting solution from step (a) to from about 90° C. to about 150° C. to form the corresponding 7 - (2' - phenylacetamido) - 3 - methyl-3-cephem-4-carboxylic acid ester, and (c) recovering the corresponding 7 - (2' - phenylacetamido) - 3 - methyl-3-cephem-4-carboxylic acid from the respective ester obtained from step (b).

10. A process which comprises (a) dissolving in a member of the group consisting of dimethylformamide, dimethylacetamide, and mixtures thereof, a 6-(2'-phenoxyacetmido)-2,2-dimethylphenam-3-carboxylic acid sulfoxide ester, said ester being selected from the group consisting of 2,2,2-trichloroethyl, p-methoxyphenyl, p-methoxybenzyl, and acetic anhydride in molar excess relative to said ester, (b) heating the resulting solution from step (a) to from about 90° C. to about 150° C. to form the corresponding 7-(2'-phenoxyacetamido)-3-methyl-3-cephem-4-carboxylic acid ester, and (c) recovering the corresponding 7-(2'-phenoxyacetamido) - 3 - methyl-3-cephem-4-carboxylic acid from the respective ester obtained from step (b).

11. A process which comprises (a) dissolving in a member of the group consisting of dimethylformamide, dimethylacetamide, and mixtures thereof, a 6-benzoyl-2,2-dimethylpenam-3-carboxylic acid sulfoxide ester, said ester being selected from the group consisting of 2,2,2-trichloroethyl, p-methoxyphenyl, p-methoxybenzyl, and acetic anhydride in molar excess relative to said ester, (b) heating the solution resulting from step (a) to from about 90° C. to about 150° C. to form 7-benzoyl-3-methyl-3-cephem-4-carboxylic acid ester, and (c) recovering the corresponding 7-benzoyl-3-methyl-3-cephem-4-carboxylic acid from the respective ester obtained in step (b).

12. In a process for converting a penicillin sulfoxide ester to antibiotic substances by heating the penicillin sulfoxide ester under acid conditions for a time sufficient to effect conversion thereof, the improvement which comprises heating the penicillin sulfoxide ester dissolved in a tertiary urea derivative at a temperature of from about 80° C. to about 175° C., which tertiary urea derivative has a formula selected from the group consisting of (a) 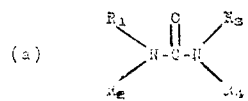

wherein $R_1$, $R_2$, $R_3$, and $R_4$ are alkyl, phenyl, tolyl, xylyl, such that $R_1$, $R_2$, $R_3$, and $R_4$ contain a combined total of up to about 18 carbon atoms (b) 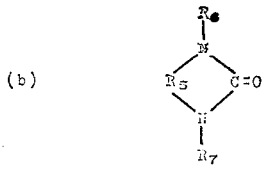

wherein $R_5$ is a bivalent alkylene radical having from 2 to 3 ring carbon atoms which alkylene radical is bonded to the nitrogens from different carbon atoms thereof, and each of $R_6$ and $R_7$ is an alkyl, phenyl, tolyl, or xylyl such that $R_5$, $R_6$, and $R_7$ have a combined total of up to about 12 carbon atoms, and (c) 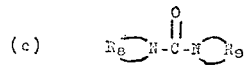

wherein each of $R_8$ and $R_9$ completes with the nitrogen to which is bonded a monocyclic mononitrogen ring containing from 5 to 6 ring forming members, one of which ring members may be oxygen gamma to the ring nitrogen, the remaining ring members being saturated carbon atoms.

13. A process as defined in claim 12 wherein the tertiary urea derivative has the formula

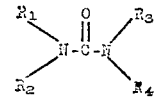

wherein $R_1$, $R_2$, $R_3$, and $R_4$ are alkyl, such that $R_1$, $R_2$, $R_3$, and $R_4$ contain a combined total of up to about 12 carbon atoms.

14. A process as defined in claim 13 wherein the tertiary urea derivative is tetramethylurea.

15. A process as defined in claim 13 wherein the tertiary urea derivative is N,N-dimethylcarbanilide.

16. A process which comprises (a) dissolving in tetramethylurea a 6-[N-(protected amino)-D-α-phenylglycylamido]-2,2-dimethylpenam - 3 - carboxylic acid sulfoxide ester, the ester group being selected from the group consisting of 2,2,2-trichloroethyl, and p-methoxyphenyl, p-methoxybenzyl, with acetic anhydride in molar excess relative to said ester, (b) heating the resulting solution from step (a) to from about 90° C. to about 150° C. to form the corresponding 7-[N-(protected amino)-D-α-phenylglycylamido]-3-methyl-3-cephem-4-carboxylate ester and (c) recovering 7-(D-α-phenylglycyclamido)-3-methyl-3-cephem-4-carboxylic acid from the respective ester obtained in step (b).

17. A process which comprises (a) dissolving in tetramethylurea a 6-(2'-phenylacetamido)-2,2-dimethylpenam-3-carboxylic acid sulfoxide ester, the ester group being selected from the group consisting of 2,2,2-trichloroethyl, p-methoxyphenyl, and p-methoxybenzyl, and acetic anhydride and in molar excess relative to said ester, (b) heating the resulting solution from step (a) to from about 90° C. to about 150° C. to form the corresponding 7-(2'-phenylacetamido)-3-methyl-3-cepham - 4 - carboxylic acid ester, and (c) recovering the corresponding 7-(2'-phenylacetamido) - 3 - methyl-3-cephem - 4 - carboxylic acid from the respective ester obtained in step (b).

18. A process which comprises (a) dissolving in tetramethylurea a 6-(2'-phenoxyacetamido) - 2,2 - dimethylpenam-3-carboxylic acid sulfoxide ester, said ester being selected from the group consisting of 2,2,2-trichloroethyl, p-methoxyphenyl, p-methoxybenzyl, and acetic anhydride in molar excess relative to said ester, (b) heating the resulting solution from step (a) to from about 90° C. to about 150° C. to form the corresponding 7-(2'-phenoxyacetamido)-3-methyl-3-cephem - 4 - carboxylic acid ester, and (c) recovering the corresponding 7-(2'-phenoxyacetamido)-3-methyl-3-cephem-4-carboxylic acid from the respective ester obtained from step (b).

19. A process which comprises (a) dissolving in tetramethylurea a 6-($\alpha,\alpha$-dimethyl-$\alpha$-phenoxyacetamido) - 2,2-dimethylpenam-3-carboxylic acid sulfoxide ester, the ester group being selected from the group consisting of 2,2,2-trichloroethyl, p-methoxyphenyl, and p-methoxybenzyl, and acetic anhydride in molar excess relative to said ester, (b) heating the solution resulting from step (a) to from 90° C. to about 150° C. to form 7-($\alpha,\alpha$-dimethyl-$\alpha$-phenoxyacetamido)-3-methyl - 3 - cephem-4-carboxylic acid ester, and (c) recovering the corresponding 7-($\alpha,\alpha$-dimethyl-$\alpha$-phenoxyacetamido)-3-methyl - 3 - cephem-4-carboxylic acid from the respective ester obtained in step (b).

20. In a process for converting a penicillin sulfoxide ester to antibiotic substances by heating the penicillin sulfoxide ester under acid conditions for a time sufficient to effect conversion thereof, the improvement which comprises heating the penicillin sulfoxide ester dissolved in a tertiary sulfonamide at a temperature of from about 80° C. to about 175° C., which tertiary sulfonamide has the formula:

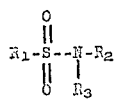

wherein
(a) each of $R_1$, $R_2$, and $R_3$ is $C_1$ to $C_{10}$ alkyl, phenyl, tolyl, or xylyl, at least one of $R_1$, $R_2$, and $R_3$ is $C_1$ to $C_{10}$ alkyl, and $R_1$, $R_2$, and $R_3$ together contain not more than 18 carbon atoms;
(b) $R_1$ is a $C_1$ to $C_{10}$ alkyl, phenyl, tolyl, or xylyl, and $R_2$ and $R_3$ are taken together with the nitrogen atom to which they are bonded to complete a monocyclic ring radical bonded to the sulfur atom, which radical contains from 4 to 6 saturated carbon atoms, and which radical can contain a ring member oxygen atom gamma to the ring nitrogen, such that $R_1$, $R_2$, and $R_3$ together contain up to about 12 carbon atoms;
(c) $R_1$ and $R_2$ are taken together with the sulfonamide grouping to which they are bonded to form a sulfur oxide and mononitrogen monocyclic ring having from 3 to 5 saturated ring carbon atoms therein, and $R_3$ is alkyl, phenyl, tolyl, or xylyl such that $R_1$, $R_2$, and $R_3$ together contain up to about 12 carbon atoms, and/or
(d) $R_1$ is —$NR_4R_5$ and each $R_2$, $R_3$, $R_4$ and $R_5$ is alkyl such that the sulfondiamide formed thereby contains up to about 12 carbon atoms.

21. A process as defined in claim 20 wherein the tertiary sulfonamide is one in which each of $R_1$, $R_2$, and $R_3$ is $C_1$ to $C_{10}$ alkyl, phenyl, tolyl, or xylyl, at least one of $R_1$, $R_2$, and $R_3$ is $C_1$ to $C_{10}$ alkyl and $R_1$, $R_2$, and $R_3$ together contain not more than 18 carbon atoms.

22. A process as defined in claim 21 wherein the tertiary sulfonamide is N,N-dimethylmethanesulfonamide.

23. A process which comprises:
(a) dissolving in tetramethylsulfondiamide a 6-($\alpha,\alpha$-dimethyl - $\alpha$ - phenoxyacetamido) - 2,2 - dimethylpenam-3-carboxylic acid sulfoxide ester, the ester group being selected from the group consisting of 2,2,2-trichloroethyl, 2,2-dichloroethyl, p-methoxyphenyl, and p-methoxybenzyl, with acetic anhydride in molar excess relative to said ester,
(b) heating the resulting solution from step (a) to from about 90° C. to about 150° C. to form the corresponding 7-($\alpha,\alpha$-dimethyl - $\alpha$ - phenoxyacetamido)-3-methyl-3-cephem-4-carboxylate ester, and
(c) recovering 7-($\alpha,\alpha$-dimethyl - $\alpha$ - phenoxyacetamido)-3-methyl-3-cephem-4-carboxylic acid from the respective ester obtained in step (b).

24. A process which comprises:
(a) dissolving in N-(propylsulfonyl)piperidine a phenoxymethyl penicillin sulfoxide ester, the ester group being selected from the group consisting of 2,2,2-trichloroethyl, 2,2-dichloroethyl, p-methoxyphenyl, and p-methoxybenzyl, with acetic anhydride in molar excess relative to said ester,
(b) heating the resulting solution from step (a) to from about 90° C. to about 150° C. to form the 7-phenoxyacetamido) - 3 - methyl - 3 - cephem-4-carboxylate ester, and
(c) recovering 7-(phenoxyacetamido) - 3 - methyl-3-cephem-4-carboxylic acid from the respective ester obtained in step (b).

25. A process which comprises:
(a) dissolving in N,N-dimethylmethanesulfonamide a 2,2,2-trichloroethyl 6 - [N-(protected amino)-D-$\alpha$-phenylglycylamido]-2,2-dimethylpenam - 3 - carboxylate sulfoxide ester, and acetic anhydride in molar excess relative to said ester,
(b) heating the solution resulting from step (a) to from about 90° C. to about 150° C. to form 2,2,2-trichloroethyl 7-[N-(protected amino)-D-$\alpha$-phenylglycylamido]-3-methyl - 3 - cephem - 4 - carboxylate ester, and
(c) recovering 7 - (D - $\alpha$ - phenylglycylacetamido)-3-methyl-3-cephem-4-carboxylic acid from the ester obtained in step (b).

References Cited
UNITED STATES PATENTS
3,275,626  9/1966  Morin et al. _____ 260—243 C NICHOLAS S. RIZZO, Primary Examiner U.S. Cl. X.R.
260—239.1

PO-1050
(5/69)

UNITED STATES PATENT OFFICE
CERTIFICATE OF CORRECTION

Patent No. 3,647,787          Dated March 7, 1972

Inventor(s) Robin D. G. Cooper

It is certified that error appears in the above-identified patent and that said Letters Patent are hereby corrected as shown below:

In column 2, line 10, "procedure" should read --procedures--.

In column 3, line 4, "(2-thiopenacetamido)" should read --(2-thiopheneacetamido)--.

In column 3, line 8, "acetamide)" should read --acetamido)--.

In column 3, line 50, "nad" should read --and--.

In column 8, line 33, "desacetoxycephalospornic" should read --desacetoxycephalosporanic--.

In column 11, line 48, "$C_{18}H_{19}Cl_3O_5S$" should read --$C_{18}H_{19}Cl_3N_2O_5S$--.

In column 13, line 54, "1,12" should read --1.12--.

In column 13, line 54, "2,25" should read --2.25--.

In column 13, line 70, "desacetoxychephalosporin" should read --desacetoxycephalosporin--.

In column 15, line 56, "declorizing" should read --decolorizing--.

In column 19, line 11, "desacetoxyephalo-" should read --desacetoxycephalo--.

In column 24, line 19, "phenoxyisopropylpencillin" should read --phenoxyisopropylpenicillin--.

In column 24, line 23, "pencillin" should read --penicillin-

UNITED STATES PATENT OFFICE
CERTIFICATE OF CORRECTION

Patent No. 3,647,787                    Dated March 7, 1972

Inventor(s) Robin D. G. Cooper

It is certified that error appears in the above-identified patent and that said Letters Patent are hereby corrected as shown below:

-2-

Column 29, line 32, "monocyclim" should read --monocyclic--.

In column 29, at lines 37 to 41, the structural formula should read

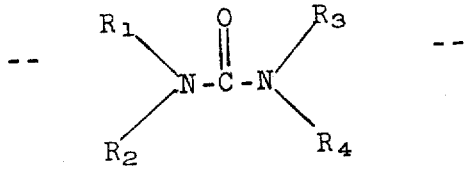

In column 30, line 62, "xlyl" should read --xylyl--.

In column 31, line 16, "3-cephem-4-carboxylic ester" should read --3-cephem-4-carboxylic acid ester--.

In column 31, line 37, "acetmido)-2,2-dimethylphenam-3-carboxylic" should read --acetamido)-2,2-dimethylpenam-3-carboxylic--.

In column 31, line 43, "respoding" should read --responding

Signed and sealed this 10th day of July 1973.

(SEAL)
Attest:

EDWARD M. FLETCHER, JR.
Attesting Officer

Rene Tegtmeyer
Acting Commissioner of Patents